United States Patent
Maruta et al.

(10) Patent No.: US 6,311,488 B1
(45) Date of Patent: Nov. 6, 2001

(54) COOLING FAN DRIVE APPARATUS

(75) Inventors: Kazuhiro Maruta; Nobumi Yoshida; Teruo Akiyama, all of Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/422,863

(22) Filed: Oct. 25, 1999

(30) Foreign Application Priority Data

Oct. 26, 1998 (JP) .................................................. 10-304446
Dec. 1, 1998 (JP) .................................................. 10-341799

(51) Int. Cl.[7] .................................................. F16D 31/02
(52) U.S. Cl. .............................. 60/450; 60/445; 60/456; 60/484
(58) Field of Search .............................. 60/445, 456, 449, 60/450, 484

(56) References Cited

U.S. PATENT DOCUMENTS

| | | | |
|---|---|---|---|
| 4,738,330 | * 4/1988 | Suzuki et al. | 60/450 |
| 4,798,050 | * 1/1989 | Nakamura et al. | 60/428 |
| 5,875,630 | * 3/1999 | Walsh et al. | 60/449 |
| 6,021,641 | * 2/2000 | Buschur et al. | 60/456 |

* cited by examiner

Primary Examiner—Edward K. Look
Assistant Examiner—Michael Leslie
(74) Attorney, Agent, or Firm—Armstrong, Westerman, Hattori, McLeland & Naughton, LLP

(57) ABSTRACT

A target fan rotational speed (R.P.M.) corresponding to a temperature detected by a temperature detector is determined according to a set correlation and the capacity of a variable-capacity hydraulic pump is varied so that the rotational speed of a cooling fan becomes that determined target fan rotational speed. It thereby becomes possible to precisely control the blowing air volume (R.P.M.) of the cooling fan, and, when the cooling fan is driven with a hydraulic source, to construct a hydraulic circuit with fewer parts. Moreover, in cases where the torque absorbed by the fan-drive hydraulic motor fluctuates, control is effected to suppress fluctuations in the cooling fan rotational speed and stabilize the rotation. Furthermore, in cases where the load on the fan-drive hydraulic motor fluctuates, control is effected to suppress fluctuations in the cooling fan rotational speed and stabilize the rotation.

22 Claims, 9 Drawing Sheets

MAX ($N_1$, $N_2$, ···) → Na (NECESSARY FAN R.P.M.)

COOLING FAN DRIVE APPARATUS

BACKGROUND OF THE INVENTION

1. Field of the Invention

This invention relates to an apparatus for driving cooling fans.

2. Description of the Related Art

In hydraulic drive equipment such as construction machinery, a hydraulic pump is driven by the engine, and actuation pressure oil discharged from the hydraulic pump is supplied to hydraulic actuators such as hydraulic cylinders through control valves, whereby working equipment is activated.

The engine and actuation pressure oil must be cooled.

The engine is mainly cooled by a water-cooling type cooling system. That is, cooling is performed by circulating a coolant (cooling water) through a water jacket provided in the engine block. Coolant that has become hot inside the water jacket is led to a radiator and there cooled, whereupon the cooled coolant is returned back to the water jacket.

The cooling of the actuation pressure oil is performed by routing the actuation pressure oil to an oil cooler. The energy loss occurring inside the hydraulic circuit is conducted as heat to the actuation pressure oil. Similarly to the coolant, the actuation pressure oil is routed to the oil cooler and there cooled, whereupon the cooled actuation pressure oil is returned back to the hydraulic circuit.

Both the radiator and the oil cooler are cooled by blown air generated by a cooling fan. In most cases, the oil cooler and radiator are placed in order in the path of the blown air generated by the cooling fan. Cooling efficiency is always considered in the specific arrangement therefor.

The cooling fan is attached to the engine drive shaft. For this reason, the cooling fan rotational speed (hereinafter referred to as R.P.M.) will correspond to the engine R.P.M.

In recent years there has been a demand for noise reduction in construction equipment. For this reason, engines are shielded as a noise-reduction measure against the noise generated by the engines. However, when the engine is shielded, it is not possible to attach a cooling fan to the engine drive shaft.

Thereupon, the technology seen in Japanese Patent Application Laid-Open No. 250342/1997, as published, is being adopted.

An invention is described in this patent publication wherein a fixed-capacity hydraulic pump for driving a fan and a fixed-capacity hydraulic motor for driving a fan are installed, separate from the engine, the pressure oil discharged from the fixed-capacity hydraulic pump for driving the fan is supplied to the fixed-capacity hydraulic motor for driving the fan, and the cooling fan is driven.

In this case, the fixed-capacity hydraulic pump is provided as a dedicated hydraulic pump for driving the fan. And, when the pressure that is applied from the dedicated fixed capacity hydraulic pump for driving the fan to the fixed-capacity hydraulic motor for driving the fan declines, control is performed by a changeover valve to replenish-supply pressure oil to the fixed-capacity hydraulic motor for driving the fan, without delay, from a tank.

The technology diagrammed in FIG. 6 is also public knowledge.

The apparatus diagrammed in FIG. 6 is an apparatus for driving a cooling fan 130, wherein a variable-capacity hydraulic pump 110 for driving a fan and a fixed-capacity hydraulic motor 120 for driving the fan are installed separately from the engine 100, and pressure oil discharged from the variable-capacity hydraulic pump 110 for driving the fan is supplied to the fixed-capacity hydraulic motor 120 for driving the fan.

In this case, a swash plate 110a of the variable-capacity hydraulic pump 110 is driven by a servo piston 160. The servo piston 160 is driven in response to the flow volume of pressure oil supplied from control valves 140 and 150. A relief valve 170 is deployed in a pipeline communicating with the control valves 140 and 150. The pressure set in this relief valve 170 varies according to the temperature inside the cooling water path of the engine 100. Accordingly, the control valves 140 and 150 are driven in response to the temperature in the cooling water path of the engine 100, so as to vary the swash plate 110a of the variable capacity hydraulic pump 110.

As based on either the invention described in the patent publication noted above or the technology diagrammed in FIG. 6, a cooling fan is driven, using as the drive source therefor a hydraulic pump that is separate from the engine. For this reason, the degree of freedom in positioning the cooling fan, radiator, oil cooler, and other equipment is increased, and both engine shielding and cooling by a cooling fan are realized. There are problems therewith, however, such as those noted below.

In the first place, the technology described in the patent publication cited above merely performs flow-volume replenishment control. This technology does not effect precise control such that the volume of blown air from the cooling fan (i.e. the R.P.M.) becomes an R.P.M. that is optimum for cooling.

The technology represented in FIG. 6, moreover, controls the swash plate of the hydraulic pump in response to changes in the pressure set in the relief valve 170. In such cases, it is difficult to effect precision control so that the air volume from the cooling fan (i.e. R.P.M.) becomes an optimum R.P.M. for cooling in response to changes in the pressure set in the relief valve 170.

Hence it is not possible with the prior art to precisely control the volume of blown air from the cooling fan (R.P.M.).

Furthermore, the fixed-capacity hydraulic pump for driving the fan described in the patent publication cited earlier is provided exclusively for the fan drive. Accordingly, it is therewith necessary to install another hydraulic pump for that purpose, resulting in an increase in the number of parts. This gives rise to a demand, in the case of driving the cooling fan with a hydraulic pressure source separate from the engine, for building the hydraulic circuit with fewer parts. This demand, however, cannot be satisfied with the prior art.

In its particulars, moreover, the control described in the patent publication cited above does nothing more than supply/replenish pressure oil, without delay, to the fan-drive fixed-capacity hydraulic motor from a tank, thus preventing cavitation.

Therewith, under conditions where the torque absorbed by the fan-drive hydraulic motor fluctuates, the cooling fan R.P.M. fluctuates also and its turning becomes unstable. As based on the invention described in the patent publication cited above, when the torque absorbed by the fan-drive hydraulic motor fluctuates, it is not possible to suppress fluctuations in the cooling fan R.P.M. and thus stably control the turning thereof.

Under conditions also wherein the load on the fan-drive hydraulic motor fluctuates, the cooling fan R.P.M. fluctuates also and its turning ceases to be stable. As based on the invention described in the patent publication cited earlier, when the load on the fan-drive hydraulic motor fluctuates, it is not possible to suppress fluctuations in the cooling fan R.P.M. and thus stably control the turning thereof.

That being so, an object of the present invention is to precisely control the blown air volume from the cooling fan (R.P.M.).

Another object of the present invention is to construct the hydraulic circuit with fewer parts in cases where the cooling fan is driven by a hydraulic pressure source.

Yet another object of the present invention is, when the torque absorbed by the fan-drive hydraulic motor fluctuates, to suppress fluctuations in the cooling fan R.P.M. and stably control the turning thereof.

Still another object of the present invention is, when the load on the fan-drive hydraulic motor fluctuates, to suppress fluctuations in the cooling fan R.P.M. and stably control the turning thereof.

SUMMARY OF THE INVENTION

Thereupon, a first invention in the present invention is a cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil, comprising:

- a variable-capacity hydraulic pump driven by said drive source;
- a hydraulic motor for turning said cooling fan, actuated by inflow through an inflow port of pressure oil discharged from said variable-capacity hydraulic pump;
- temperature detection means for detecting temperature of said drive source or of said actuation pressure oil;
- setting means for setting correlation between said temperature of said drive source or said actuation pressure oil and a target fan rotational speed (R.P.M.) for said cooling fan; and
- capacity control means for determining target fan rotational speed corresponding to temperature detected by said temperature detection means, in accordance with correlation set by said setting means, and varying capacity of said variable-capacity hydraulic pump so that said cooling fan rotational speed becomes that determined target fan rotational speed.

The first invention is described with reference to FIG. 1(a).

As based on the first invention, an optimum target fan R.P.M. Na is determined from the results of detecting the current temperature t, a control command i for obtaining that target value is output by a controller 13, and a swash plate drive mechanism 17 is drive-controlled. Thus the air volume from the cooling fan 8 (R.P.M.) can be precisely controlled. As based on the present invention, moreover, the cooling fan 8 is turned so as to satisfy the targeted fan R.P.M. Na corresponding to the detected temperature t, wherefore energy loss can be minimized and optimal cooling implemented.

A second invention is the first invention, further comprising pump input rotational speed detection means for detecting input rotational speed of said variable-capacity hydraulic pump, wherein said capacity control means vary capacity of said variable-capacity hydraulic pump so that flow volume of pressure oil discharged by said variable-capacity hydraulic pump, as based on rotational speed detected by said pump input rotational speed detection means, becomes a target discharge flow volume corresponding to temperature detected by said temperature detection means.

The second invention is now described with reference to FIG. 1(a).

As based on the second invention, an optimum target discharge flow volume $Q_a$ is determined from the results of detecting the current temperature t and the pump input R.P.M. $n_e$ (engine 1 R.P.M. $n_e$), a control command i for obtaining this target value is output from the controller 13, and the swash plate drive mechanism 17 is drive-controlled. Thus the air volume from the cooling fan 8 (R.P.M.) can be precisely controlled. As based on the present invention, moreover, the cooling fan 8 is turned so as to satisfy the targeted discharge flow volume $Q_a$ corresponding to the detected temperature t and the pump input R.P.M. $n_e$, wherefore energy loss can be minimized and optimal cooling implemented.

A third invention is the first invention or the second invention, further comprising fan rotational speed detection means for detecting cooling fan rotational speed, wherein said capacity control means effects control so that, as based on detection results of said fan rotational speed detection means, said target fan rotational speed or said target discharge flow volume is obtained.

The third invention is now described with reference to FIG. 1(a).

As based on the third invention, the same benefits are obtainable as with the first invention and the second invention.

As based on the third invention, when R.P.M. control is imposed on the cooling fan 8 by the controller 13, the actual fan R.P.M. N of the cooling fan 8 detected by a fan R.P.M. sensor 16 is used as a feedback signal, and feedback control is effected so that the deviation between the target fan R.P.M. Na and the actual fan R.P.M. N becomes zero.

A fourth invention is the first invention or the second invention, further comprising working machine actuated by said hydraulic actuator and work mode selection means for selecting work mode performed by said working machine, wherein said target fan rotational speed or said target discharge flow volume is determined according to work mode selected by said work mode selection means.

The fourth invention is now described with reference to FIG. 1(a).

As based on the fourth invention, the same benefits are obtainable as with the first invention and the second invention.

Also, as based on the fourth invention, even if the engine R.P.M. $n_e$ changes according to the work mode M selected, the optimum target fan R.P.M. Na or the optimum discharge flow volume $Q_a$ can be determined from the selected work mode M and the results of detecting the current temperature t, whereupon a control command i for obtaining that target value is output from the controller 13 and the swash plate drive mechanism 17 is drive-controlled. Thus the air volume from the cooling fan 8 (R.P.M.) can be precisely controlled. As based on the present invention, the cooling fan 8 is turned so as to satisfy the targeted fan R.P.M. Na corresponding to the detected temperature t and the selected work mode M, wherefore energy loss can be minimized and optimal cooling implemented.

A fifth invention is a cooling fan drive apparatus having a main hydraulic pump driven by a drive source; a hydraulic actuator actuated by supply of actuation pressure oil discharged from said main hydraulic pump, via a control valve;

and a cooling fan for cooling said drive source or said actuation pressure oil; comprising:

a fan-drive hydraulic pump driven by said drive source; and a variable-capacity hydraulic motor for turning said cooling fan, activated by inflow, through an inflow port, of pressure oil discharged from said fan-drive hydraulic pump.

The fifth invention is now described with reference to FIG. 1(b).

As based on the fifth invention, the fan-drive hydraulic motor 7 that drives the cooling fan 8 is a variable-capacity type, wherefore the control of the R.P.M. (blown air volume) of the cooling fan can be performed by drive-controlling the capacity (swash plate) 7c of the variable-capacity hydraulic motor 7 using the swash plate drive mechanism 17.

A sixth invention is a cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:

a fixed-capacity hydraulic pump driven by said drive source;

a variable-capacity hydraulic motor for turning said cooling fan, actuated by inflow through an inflow port of pressure oil discharged from said fixed-capacity hydraulic pump;

a fixed restriction provided in pressure oil discharge pipeline of said fixed-capacity hydraulic pump; and capacity control means for detecting input rotational speed of said fixed-capacity hydraulic pump according to difference in pressure before and after said fixed restriction, and varying capacity of said variable-capacity hydraulic motor so that a rotational speed of said cooling fan becomes a target rotational speed, based on input rotational speed so detected.

The sixth invention is now described with reference to FIG. 1(b).

As based on the sixth invention, the pump input R.P.M. $n_e$ (engine 1 R.P.M. $n_e$) is found from the pressure differential P P before and after the fixed restriction 33, the optimum target R.P.M. Na is determined from that R.P.M., a control command i for obtaining that target value is output by the controller 13, and the swash plate drive mechanism 17 is drive-controlled. Thus it is possible to precisely control the blown air volume (R.P.M.) of the cooling fan 8.

A seventh invention is a cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:

a variable-capacity hydraulic motor for turning said cooling fan, activated by inflow, through an inflow port, of pressure oil discharged from said main hydraulic pump.

The seventh invention is now described with reference to FIG. 2.

As based on the seventh invention, by employing the main hydraulic pump 2 that preexists for driving the work equipment as the hydraulic pump for driving the fan, the installation of the dedicated fan-drive hydraulic pumps 5 and 5 (cf. FIG. 1) can be eliminated. For this reason, the number of parts in the hydraulic machinery can be further reduced.

An eighth invention is the seventh invention, further comprising means for causing communication, by a pipeline, between a tank into which pressure oil flowing out from said variable-capacity hydraulic motor is discharged and inflow port of said variable-capacity hydraulic motor, and for routing pressure oil, through that pipeline, only to said inflow port of said variable-capacity hydraulic motor.

The eighth invention is now described with reference to FIG. 2 and FIG. 1(a).

As based on the eighth invention, the same benefits are obtainable as with the seventh invention. As based on the eighth invention, furthermore, pressure oil from a tank 9 is routed through a check valve 11 in a pipeline 10, together with pressure oil discharged from the main hydraulic pump 2, to the inflow port 7a of the fan-drive hydraulic motor 7. Accordingly, the development of cavitation can be prevented in cases such as when a very rapid pressure fluctuation occurs.

A ninth invention is a cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:

a variable-capacity hydraulic motor for turning said cooling fan, activated by inflow, through an inflow port, of pressure oil discharged from said main hydraulic pump;

temperature detection means for detecting temperature of said drive source or said actuation pressure oil;

setting means for setting correlation between temperature of said drive source or of said actuation pressure oil and a target fan rotational speed for said cooling fan; and capacity control means for determining a target fan rotational speed corresponding to temperature detected by said temperature detection means, in accordance with correlation set by said setting means, and varying capacity of said variable-capacity hydraulic motor so that said cooling fan rotational speed becomes that determined target fan rotational speed.

The ninth invention is now described with reference to FIG. 2.

As based on the ninth invention, by employing the main hydraulic pump 2 that preexists for driving the work equipment as the hydraulic pump for driving the fan, the installation of the dedicated fan-drive hydraulic pumps 5 and 5 (cf. FIG. 1) can be eliminated. For this reason, the number of parts in the hydraulic machinery can be further reduced.

As based on the ninth invention, moreover, the optimum target fan R.P.M. Na is determined from the results of detecting the current temperature t, a control command i for obtaining that target value is output by a controller 13, and a swash plate drive mechanism 24 is drive-controlled. Thus the air volume from the cooling fan 8 (R.P.M.) can be precisely controlled. As based on the present invention, moreover, the cooling fan 8 is turned so as to satisfy the targeted fan R.P.M. Na corresponding to the detected temperature t, wherefore energy loss can be minimized and optimal cooling implemented.

A tenth invention is the ninth invention, further comprising fan rotational speed detection means for detecting rotational speed of said cooling fan, wherein said capacity control means effects control so that a target fan rotational speed is obtained based on detection results of said fan rotational speed detection means.

The tenth invention is now described with reference to FIG. 2.

As based on the tenth invention, the same benefits are obtainable as with the ninth invention.

As based on the tenth invention, moreover, when R.P.M. control is imposed on the cooling fan 8 by the controller 13, the actual fan R.P.M. N of the cooling fan 8 detected by a fan R.P.M. sensor 16 is used as a feedback signal, and feedback control is effected so that the deviation between the target fan R.P.M. Na and the actual fan R.P.M. N becomes zero.

An 11th invention is the ninth invention, further comprising pump input rotational speed detection means for detecting input rotational speed of said main hydraulic pump, wherein said target fan rotational speed is determined in response to input rotational speed detected by said pump input rotational speed detection means.

The 11th invention is now described with reference to FIG. 2.

As based on the 11th invention, the same benefits are obtainable as with the ninth invention.

Also, as based on the 11th invention, even if the pump input R.P.M. (engine R.P.M. $n_e$) changes, the optimum target fan R.P.M. Na can be determined from the pump input R.P.M. $n_e$ and the results of detecting the current temperature t, whereupon a control command i for obtaining that target value is output from the controller 13 and the swash plate drive mechanism 24 is drive-controlled. Thus, even if the pump input R.P.M. ne fluctuates, the air volume from the cooling fan 8 (R.P.M.) can be precisely controlled. As based on the present invention, the cooling fan 8 is turned so as to satisfy the targeted fan R.P.M. Na corresponding to the detected temperature t and the detected pump input R.P.M. $n_e$, wherefore energy loss can be minimized and optimal cooling implemented.

A 12th invention is the ninth invention, further comprising working machine activated by said hydraulic actuator, and work mode selection means for selecting work mode performed by said working machine; wherein said target fan rotational speed is determined according to work mode selected by said work mode selection means.

The 12th invention is now described with reference to FIG. 2.

As based on the 12th invention, the same benefits are obtainable as with the ninth invention.

Also, as based on the 12th invention, even if the engine R.P.M. $n_e$ changes according to the work mode M selected, the optimum target fan R.P.M. Na can be determined from the selected work mode M and the results of detecting the current temperature t, whereupon a control command i for obtaining that target value is output from the controller 13 and the swash plate drive mechanism 24 is drive-controlled Thus the air volume from the cooling fan 8 (R.P.M.) can be precisely controlled, irrespective of the switch position for the work mode M. As based on the present invention, the cooling fan 8 is turned so as to satisfy the targeted fan R.P.M. Na corresponding to the detected temperature t and the selected work mode M, wherefore energy loss can be minimized and optimal cooling implemented.

A 13th invention is a cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:
 a variable-capacity hydraulic motor for turning said cooling fan, activated by inflow, through an inflow port, of pressure oil discharged from said main hydraulic pump; and
 torque control means for effecting control so that torque absorbed by said variable-capacity hydraulic motor coincides with a target absorbed torque.

The 13th invention is now described with reference to FIG. 2.

As based on the 13th invention, by employing the main hydraulic pump 2 that preexists for driving the work equipment as the hydraulic pump for driving the fan, the installation of the dedicated fan-drive hydraulic pumps 5 and 5 (cf. FIG. 1) can be eliminated. For this reason, the number of parts in the hydraulic machinery can be further reduced.

As based on the 13th invention, furthermore, an electric current command i for making the torque T absorbed by the fan-drive hydraulic motor 7a constant absorbed torque value Ta is output to the swash plate drive mechanism 24. As a consequence, the torque T absorbed by the fan-drive hydraulic motor 7 is made to coincide with the constant torque value Ta. As a result, fluctuations in the fan R.P.M. N of the cooling fan 8 are suppressed and the turning thereof stabilizes.

A 14th invention is a cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:
 a variable-capacity hydraulic motor for turning said cooling fan, activated by inflow, through an inflow port, of pressure oil discharged from said main hydraulic pump; and
 a capacity control valve for controlling capacity of said variable-capacity hydraulic motor so that torque absorbed by said variable-capacity hydraulic motor coincides with a set absorbed torque.

The 14th invention is now described with reference to FIG. 7.

As based on the 14th invention, the R.P.M. (blown air volume) of the cooling fan 8 is controlled by drive-controlling a swash plate drive mechanism 41 which varies the capacity (swash plate 7c) of the variable-capacity fan-drive hydraulic motor 7. The hydraulic circuit can be constructed using for the swash plate drive mechanism 41 a mechanism that is the same as the swash plate drive mechanism 40 used for driving the swash plate of the main hydraulic pump 2 used for the ordinary working equipment. Accordingly, it is possible to provide a cooling fan drive apparatus of high general usability.

As based on the 14th invention, furthermore, by employing the main hydraulic pump 2 that preexists for driving the work equipment as the hydraulic pump for driving the fan, the installation of a dedicated fan-drive hydraulic pump can be eliminated. For this reason, the number of parts in the hydraulic machinery can be further reduced.

As based on the 14th invention, moreover, a capacity control valve 54 is drive-controlled in response to a command i for making the torque T absorbed by the fan-drive hydraulic motor 7a set absorbed torque value Ta. As a consequence, even under conditions where the torque T absorbed by the fan-drive hydraulic motor 7 fluctuates, the absorbed torque T is maintained at the set torque value Ta. As a result, fluctuations in the fan R.P.M. N of the cooling fan 8 are suppressed and the turning thereof stabilizes.

A 15th invention is a cooling fan drive apparatus having a main hydraulic pump driven by a drive source; a hydraulic actuator actuated by supply of actuation pressure oil discharged from said main hydraulic pump, via a control valve; a cooling fan for cooling said drive source or said actuation pressure oil; and a main pump capacity control valve for controlling capacity of said main hydraulic pump so that pressure differential between discharge pressure of said main hydraulic pump and load pressure at said hydraulic actuator becomes a desired set pressure differential; comprising:

a variable-capacity hydraulic motor for turning said cooling fan, activated by inflow, through an inflow port, of pressure oil discharged from said main hydraulic pump;

a capacity control valve for controlling capacity of said variable-capacity hydraulic motor so that torque absorbed by said variable-capacity hydraulic motor coincides with a set absorbed torque; and load pressure selection means for selecting from among load pressure at said hydraulic actuator and load pressure at said variable-capacity hydraulic motor whichever load pressure is greater; wherein:

said main hydraulic pump capacity control means are made to exercise control so as to render pressure differential between discharge pressure of said main hydraulic pump and load pressure selected by said load pressure selection means a desired set pressure differential.

The 15th invention is now described with reference to FIG. 7.

As based on the 15th invention, the R.P.M. (blown air volume) of the cooling fan 8 is controlled by drive-controlling a swash plate drive mechanism 41 which varies the capacity (swash plate 7c) of the variable-capacity fan-drive hydraulic motor 7. The hydraulic circuit can be constructed using for the swash plate drive mechanism 41 a mechanism that is the same as the swash plate drive mechanism 40 used for driving the swash plate of the main hydraulic pump 2 used for the ordinary working equipment. Accordingly, it is possible to provide a cooling fan drive apparatus of high general usability.

As based on the 15th invention, furthermore, by employing the main hydraulic pump 2 that preexists for driving the work equipment as the hydraulic pump for driving the fan, the installation of a dedicated fan-drive hydraulic pump can be eliminated. For this reason, the number of parts in the hydraulic machinery can be further reduced.

As based on the 15th invention, moreover, a capacity control valve 54 is drive-controlled in response to a command i for making the torque T absorbed by the fan-drive hydraulic motor 7a set absorbed torque value Ta. As a consequence, even under conditions where the torque T absorbed by the fan-drive hydraulic motor 7 fluctuates, the absorbed torque T is maintained at the set torque value Ta. As a result, fluctuations in the fan R.P.M. N of the cooling fan 8 are suppressed and the turning thereof stabilizes.

With a main pump capacity control valve 50, however, load-sensing control is performed to make the pressure differential between the discharge pressure Pm of the main hydraulic pump 2 and the load pressure $P_{LS}$ at the hydraulic actuator 4 a desired set pressure differential. Here, the main hydraulic pump 2 is the common hydraulic drive source for the hydraulic actuator 4 and the fan-drive hydraulic motor 7. That being so, if load-sensing control is to be performed under conditions where the hydraulic actuator load (working equipment load) is light, the load pressure $P_{LS}$ at the hydraulic actuator 4 becomes lower and, in conjunction therewith, the discharge pressure Pm of the main hydraulic pump 2 also becomes lower. Accordingly, the flow volume supplied to the fan-drive hydraulic motor 7 from the main hydraulic pump 2 will be insufficient. For this reason, the minimum torque needed to turn the fan-drive hydraulic motor 7 cannot be secured.

That being so, in this 15th invention, selection is made of the larger load pressure among the load pressure $P_{LS}$ at the hydraulic actuator 4 and the load pressure $P_{mLS}$ at the fan-drive hydraulic motor 7. Under conditions where the hydraulic actuator 4 load (working equipment load) is light, the load pressure $P_{mLS}$ at the fan-drive hydraulic motor 7 is selected. This load pressure $P_{mLS}$ is a pressure that roughly coincides with the discharge pressure Pm of the main hydraulic pump 2.

With the main hydraulic pump capacity control means 50, moreover, load-sensing control is performed to make the pressure differential between the discharge pressure Pm of the main hydraulic pump 2 and the load pressure selected as described above ($P_{mLS}$) a desired set pressure differential. Accordingly, the selected load pressure $P_{mLS}$ is higher than the load pressure $P_{LS}$ at the hydraulic actuator 4, wherefore, in conjunction therewith, the discharge pressure Pm of the main hydraulic pump 2 will become higher. That being so, the load pressure $P_{mLS}$ at the fan-drive hydraulic motor 7 will increase. For this reason, the minimum torque necessary for turning the fan-drive hydraulic motor 7 can be secured.

A 16th invention is a cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:

a variable-capacity hydraulic motor for turning said cooling fan; and a flow volume control valve, provided in a pipeline connecting pressure oil discharge port of said main hydraulic pump and inflow port of said variable-capacity hydraulic motor, for controlling flow volume of pressure oil made to flow from said pressure oil discharge port of said main hydraulic pump into said inflow port of said variable-capacity hydraulic motor.

The 16th invention is now described with reference to FIG. 8.

As based on the 16th invention, the R.P.M. (blown air volume) of the cooling fan 8 is controlled by drive-controlling a swash plate drive mechanism 41 which varies the capacity (swash plate 7c) of the variable-capacity fan-drive hydraulic motor 7. The hydraulic circuit can be constructed using for the swash plate drive mechanism 41 a mechanism that is the same as the swash plate drive mechanism 40 used for driving the swash plate of the main hydraulic pump 2 used for the ordinary working equipment. Accordingly, it is possible to provide a cooling fan drive apparatus of high general usability.

As based on the 16th invention, furthermore, by employing the main hydraulic pump 2 that preexists for driving the work equipment as the hydraulic pump for driving the fan, the installation of a dedicated fan-drive hydraulic pump can be eliminated. For this reason, the number of parts in the hydraulic machinery can be further reduced.

As based on the 16th invention, furthermore, a flow volume control valve 69 is provided on the fan-drive hydraulic motor 7 side for controlling the flow volume of the pressure oil supplied to the fan-drive hydraulic motor 7, similarly to the control valve 3 for controlling the flow volume of the pressure oil supplied to the working equipment hydraulic actuator 4.

A 17th invention is a cooling fan drive apparatus having a main hydraulic pump driven by a drive source; a hydraulic actuator actuated by supply of actuation pressure oil discharged from said main hydraulic pump, via a control valve; a cooling fan for cooling said drive source or said actuation pressure oil; and a main pump capacity control valve for controlling capacity of said main hydraulic pump so that pressure differential between discharge pressure of said main hydraulic pump and load pressure at said hydraulic actuator becomes a first set pressure differential; comprising:

a variable-capacity hydraulic motor for turning said cooling fan;

a flow volume control valve, provided in a pipeline connecting pressure oil discharge port of said main hydraulic pump and inflow port of said variable-capacity hydraulic motor, for controlling flow volume of pressure oil made to flow from said pressure oil discharge port of said main hydraulic pump into said inflow port of said variable-capacity hydraulic motor;

a pressure differential control valve for controlling capacity of said variable-capacity hydraulic motor so that pressure differential between pressure of pressure oil flowing into said flow volume control valve and pressure of pressure oil flowing out from said flow volume control valve becomes a second set pressure differential; and pressure selection means for selecting from among load pressure at said hydraulic actuator and pressure of pressure oil flowing out from said flow volume control valve whichever pressure is greater; wherein:

said main hydraulic pump capacity control means are made to exercise control so as to make pressure differential between discharge pressure of said main hydraulic pump and pressure selected by said pressure selection means a first set pressure differential.

The 17th invention is now described with reference to FIG. 8.

As based on the 17th invention, the R.P.M. (blown air volume) of the cooling fan 8 is controlled by drive-controlling a swash plate drive mechanism 41 which varies the capacity (swash plate 7c) of the variable-capacity fan-drive hydraulic motor 7. The hydraulic circuit can be constructed using for the swash plate drive mechanism 41 a mechanism that is the same as the swash plate drive mechanism 40 used for driving the swash plate of the main hydraulic pump 2 used for the ordinary working equipment. Accordingly, it is possible to provide a cooling fan drive apparatus of high general usability.

As based on the 17th invention, furthermore, by employing the main hydraulic pump 2 that preexists for driving the work equipment as the hydraulic pump for driving the fan, the installation of a dedicated fan-drive hydraulic pump can be eliminated. For this reason, the number of parts in the hydraulic machinery can be further reduced.

As based on the 17th invention, furthermore, a flow volume control valve 69 is provided on the fan-drive hydraulic motor 7 side for controlling the flow volume of the pressure oil supplied to the fan-drive hydraulic motor 7, similarly to the control valve 3 for controlling the flow volume of the pressure oil supplied to the working equipment hydraulic actuator 4.

With the pressure differential control valve 77, load-sensing control is effected to make the pressure differential $\Delta Pm$ between the pressures before and after the flow volume control valve 69 (Pm and $P_{mLS}$) ($\Delta Pm = Pm\ P_{mLS}$) a second set pressure differential.

Here, from the general formulas for hydraulic circuits, if Ar is the aperture area of the restriction in the flow volume control valve 69 and c is the flow volume coefficient, then the relationship expressed below is established between the flow volume Qm flowing before and after the restriction in the flow volume control valve 69 (that is, the flow volume Qm supplied to the fan-drive hydraulic motor 7) and the pressure differential $\Delta Pm$ before and after the restriction in the flow volume control valve 69.

$$Qm = c \cdot Ar \cdot \sqrt{(\Delta Pm)} \quad (1)$$

As is evident from formula (1) above, if the before-and-after pressure differential $\Delta Pm$ is maintained at the desired second set pressure differential, a flow volume Qm is obtained which is proportional to the aperture area Ar. Therefore, when that is so, the flow volume Qm supplied to the fan-drive hydraulic motor 7 will vary in direct proportion with the drive command value (aperture command Ar) to the flow volume control valve 69, and the R.P.M. N of the cooling fan 8 will vary in direct proportion with that flow volume Qm. The torque T absorbed by the fan-drive hydraulic motor 7 will also vary in response to changes in the R.P.M. N of the cooling fan 8. Hence, by controlling the flow volume control valve 69, the constant absorbed torque value T required by the fan-drive hydraulic motor 7 is obtained, and the constant fan R.P.M. Na is obtained at the cooling fan 8.

Furthermore, because provision is made for performing load-sensing control, even under conditions where the load $P_{mLS}$ on the fan-drive hydraulic motor 7 fluctuates, a constant fan R.P.M. Na that is directly proportional to the aperture command Ar to the flow volume control valve 69 is obtained at the cooling fan 8.

Thus, as based on the 17th invention, even in cases where the load on the fan-drive hydraulic motor 7 fluctuates, fluctuations in the R.P.M. N of the cooling fan 8 are suppressed and the turning thereof stabilizes.

Meanwhile, load-sensing control is also effected in the main pump capacity control valve 50 to make the pressure differential $\Delta P$ between the discharge pressure Pm of the main hydraulic pump 2 and the load pressure $P_{LS}$ at the hydraulic actuator 4 the first set pressure differential. Here, the main hydraulic pump 2 is the common hydraulic drive source for the hydraulic actuator 4 and the fan-drive hydraulic motor 7. Hence, when load-sensing control is performed under conditions where the load on the hydraulic actuator 4 (working equipment load) is light, the load pressure $P_{LS}$ at the hydraulic actuator 4 will become lower and, in conjunction therewith, the discharge pressure Pm of the main hydraulic pump 2 will also become lower. Accordingly, the flow volume supplied to the fan-drive hydraulic motor 7 from the main hydraulic pump 2 will be insufficient. For this reason, the minimum torque required to turn the fan-drive hydraulic motor 7 cannot be secured.

Thereupon, in this 18th invention, the larger pressure is selected from among the load pressure $P_{LS}$ at the hydraulic actuator 4 and the pressure $P_{mLS}$ of the pressure oil flowing out from the flow volume control valve 69 (i.e. the load pressure $P_{mLS}$ at the fan-drive hydraulic motor 7). Under conditions where the load on the hydraulic actuator 4 (working equipment load) is light, the pressure $P_{mLS}$ of the pressure oil flowing out from the flow volume control valve 69 (the load pressure $P_{mLS}$ at the fan-drive hydraulic motor 7) is selected.

With the main hydraulic pump capacity control means 50, moreover, load-sensing control is performed to make the pressure differential between the discharge pressure Pm of the main hydraulic pump 2 and the load pressure selected as described above ($P_{mLS}$) a desired set pressure differential. Accordingly, the selected load pressure $P_{mLS}$ is higher than the load pressure $P_{LS}$ at the hydraulic actuator 4, wherefore, in conjunction therewith, the discharge pressure Pm of the main hydraulic pump 2 will become higher. That being so, the load pressure $P_{mLS}$ at the fan-drive hydraulic motor 7 will increase. For this reason, the minimum torque necessary for turning the fan-drive hydraulic motor 7 can be guaranteed.

An 18th invention is the 14th, 15th, 16th, or 17th invention, further comprising means for causing communication, by a pipeline, between a tank into which pressure oil flowing out from said variable-capacity hydraulic motor is discharged and said inflow port of said variable-capacity hydraulic motor, and for routing pressure oil, through that pipeline, only to said inflow port of said variable-capacity hydraulic motor.

The 18th invention is now described with reference to FIG. 8.

As based on the 18th invention, the same benefits are obtainable as with the 14th, 15th, 16th, or 17th invention.

As based on the 18th invention, furthermore, pressure oil from a tank 9 is routed through a check valve 90 in a pipeline 65, together with pressure oil discharged from the main hydraulic pump 2, to the inflow port 7a of the fan-drive hydraulic motor 7. Accordingly, the development of cavitation can be prevented in cases such as when a very rapid pressure fluctuation occurs.

A 19th invention is a cooling fan drive apparatus having a main hydraulic pump driven by a drive source and provided with a plurality of pressure oil discharge ports; a hydraulic actuator actuated by supply of actuation pressure oil discharged from said plurality of pressure oil discharge ports of said main hydraulic pump, via a control valve; and a cooling fan for cooling said drive source or said actuation pressure oil; comprising:

selection means for selecting, from among actuation pressure oils discharged from said plurality of pressure oil discharge ports in said main hydraulic pump, that actuation pressure oil having greatest pressure; and a variable-capacity hydraulic motor for turning said cooling fan, activated by flowing in of actuation pressure oil selected by said selection means from said inflow port.

The 19th invention is now described with reference to FIG. 9.

As based on the 19th invention, the R.P.M. (blown air volume) of the cooling fan 8 is controlled by drive-controlling a swash plate drive mechanism 41 which varies the capacity (swash plate 7c) of the variable-capacity fan-drive hydraulic motor 7. The hydraulic circuit can be constructed using for the swash plate drive mechanism 41 a mechanism that is the same as the swash plate drive mechanisms 40 and 40 used for driving the swash plates of the main hydraulic pumps 2 and 2 used for the ordinary working equipment. Accordingly, it is possible to provide a cooling fan drive apparatus of high general usability.

As based on the 19th invention, furthermore, by employing the main hydraulic pumps 2 and 2 that preexist for driving the work equipment as the hydraulic pumps for driving the fan, the installation of a dedicated fan-drive hydraulic pump can be eliminated. For this reason, the number of parts in the hydraulic machinery can be further reduced. As based on the 19th invention, when a plurality of pressure oil discharge ports 2b and 2b are provided in the main hydraulic pumps 2 and 2, the pump discharge oil on the high-pressure side can be supplied to the fan-drive hydraulic motor 7.

A 20th invention is a cooling fan drive apparatus having a main hydraulic pump driven by a drive source and provided with a plurality of pressure oil discharge ports; a plurality of hydraulic actuators actuated by supply of actuation pressure oil discharged from said plurality of pressure oil discharge ports of said main hydraulic pump, via control valves; and a cooling fan for cooling said drive source or said actuation pressure oil; comprising:

a variable-capacity hydraulic motor for turning said cooling fan;

pump pressure selection means for selecting, from among actuation pressure oils discharged from said plurality of pressure oil discharge ports in said main hydraulic pump, that actuation pressure oil having greatest pressure;

a pipeline for connecting actuation pressure oil selected by said pump pressure selection means to inflow port in said variable-capacity hydraulic motor;

a flow volume control valve, provided in said pipeline, for controlling flow volume of pressure oil flowing into said inflow port in said variable-capacity hydraulic motor;

a pressure differential control valve for controlling capacity of said variable-capacity hydraulic motor so that pressure differential between pressure of pressure oil flowing into said flow volume control valve and pressure of pressure oil flowing out from said flow volume control valve becomes a second set pressure differential; and load pressure selection means for selecting from among load pressures at said plurality of hydraulic actuators and pressure of pressure oil flowing out from said flow volume control valve whichever pressure is greatest; wherein:

said main hydraulic pump capacity control means are made to exercise control so as to render pressure differential between discharge pressure of said main hydraulic pump and pressure selected by said load pressure selection means said first set pressure differential.

The 20th invention is now described with reference to FIG. 9.

As based on the 20th invention, the R.P.M. (blown air volume) of the cooling fan 8 is controlled by drive-controlling a swash plate drive mechanism 41 which varies the capacity (swash plate 7c) of the variable-capacity fan-drive hydraulic motor 7. The hydraulic circuit can be constructed using for the swash plate drive mechanism 41 a mechanism that is the same as the swash plate drive mechanisms 40 and 40 used for driving the swash plates of the main hydraulic pumps 2 and 2 used for the ordinary working equipment. Accordingly, it is possible to provide a cooling fan drive apparatus of high general usability.

As based on the 20th invention, furthermore, by employing the main hydraulic pumps 2 and 2 that preexist for driving the work equipment as the hydraulic pumps for driving the fan, the installation of a dedicated fan-drive hydraulic pump can be eliminated. For this reason, the number of parts in the hydraulic machinery can be further reduced. As based on the 23rd invention, when a plurality of pressure oil discharge ports 2b and 2b are provided in the main hydraulic pumps 2 and 2, the pump discharge oil on the high-pressure side can be supplied to the fan-drive hydraulic motor 7.

As based on the 20th invention, furthermore, a flow volume control valve 69 is provided on the fan-drive hydraulic motor 7 side for controlling the flow volume of the pressure oil supplied to the fan-drive hydraulic motor 7, similarly to the control valves 3 and 3 for controlling the flow volume of the pressure oil supplied to the working equipment hydraulic actuators 4 and 4.

With the pressure differential control valve 77, load-sensing control is effected to make the pressure differential $\Delta Pm$ between the pressures before and after the flow volume control valve 69 (Pm and $P_{mLS}$) ($\Delta Pm = Pm\ P_{mLS}$) a second set pressure differential.

As is evident from the general hydraulic formula (1) above, if the before-and-after pressure differential $\Delta P$ is maintained at the desired second set pressure differential, a flow volume Qm is obtained which is proportional to the aperture area Ar. Therefore, when that is so, the flow volume Qm supplied to the fan-drive hydraulic motor 7 will vary in direct proportion with the drive command value (aperture command Ar) to the flow volume control valve 69, and the R.P.M. N of the cooling fan 8 will vary in direct proportion with that flow volume Qm. The torque T absorbed by the fan-drive hydraulic motor 7 will also vary in response to changes in the R.P.M. N of the cooling fan 8. Hence, by controlling the flow volume control valve 69, the constant absorbed torque value T required by the fan-drive hydraulic motor 7 is obtained, and the constant fan R.P.M. Na is obtained at the cooling fan 8.

Furthermore, because provision is made for performing load-sensing control, even under conditions where the load $P_{mLS}$ on the fan-drive hydraulic motor 7 fluctuates, a constant fan R.P.M. Na that is directly proportional to the aperture command Ar to the flow volume control valve 69 is obtained at the cooling fan 8.

Thus, as based on the 20th invention, even in cases where the load on the fan-drive hydraulic motor 7 fluctuates, fluctuations in the R.P.M. N of the cooling fan 8 are suppressed and the turning thereof stabilizes.

Meanwhile, load-sensing control is also effected in the main pump capacity control valves 50 and 50 to make the pressure differential ΔP between the discharge pressures P1 and P2 of the main hydraulic pumps 2 and 2 and the load pressure (maximum load pressure) $P_{LS}$ at the plurality of hydraulic actuators 4 the first set pressure differential. Here, the main hydraulic pumps 2 and 2 are common hydraulic drive sources for the plurality of hydraulic actuators 4 and 4 and the fan-drive hydraulic motor 7. Hence, when load-sensing control is performed under conditions where the maximum load on the hydraulic actuators (maximum working equipment load) is light, the maximum load pressure $P_{LS}$ at the plurality of hydraulic actuators 4 and 4 will become lower and, in conjunction therewith, the discharge pressures P1 and P2 of the main hydraulic pumps 2 and 2 will also become lower. Accordingly, the flow volume supplied to the fan-drive hydraulic motor 7 from the main hydraulic pumps 2 and 2 will be insufficient. For this reason, the minimum torque required to turn the fan-drive hydraulic motor 7 cannot be secured.

Thereupon, in this 20th invention, the larger pressure is selected from among the maximum load pressure $P_{LS}$ at the plurality of hydraulic actuators 4 and 4 and the pressure $P_{mLS}$ of the pressure oil flowing out from the flow volume control valve 69 (i.e. load pressure $P_{mLS}$ on the fan-drive hydraulic motor 7). Under conditions where the maximum load on the plurality of hydraulic actuators 4 and 4 (working equipment load) is light, the pressure $P_{mLS}$ of the pressure oil flowing out from the flow volume control valve 69 (the load pressure $P_{mLS}$ at the fan-drive hydraulic motor 7) is selected.

With the main hydraulic pump capacity control means 50, moreover, load-sensing control is performed to make the pressure differential between the discharge pressure Pm of the main hydraulic pump 2 and the load pressure selected as described above ($P_{mLS}$) a desired set pressure differential. Accordingly, the selected load pressure $P_{mLS}$ is higher than the maximum load pressure $P_{LS}$ at the plurality of hydraulic actuators 4 and 4, wherefore, in conjunction therewith, the discharge pressures P1 and P2 of the main hydraulic pumps 2 and 2 will become higher. That being so, the load pressure $P_{mLS}$ at the fan-drive hydraulic motor 7 will increase. For this reason, the minimum torque necessary for turning the fan-drive hydraulic motor 7 can be secured.

DESCRIPTION OF THE PREFERRED EMBODIMENTS

Embodying aspects of cooling fan drive apparatuses relating to the present invention are now described with reference to the drawings.

Figure 1A:
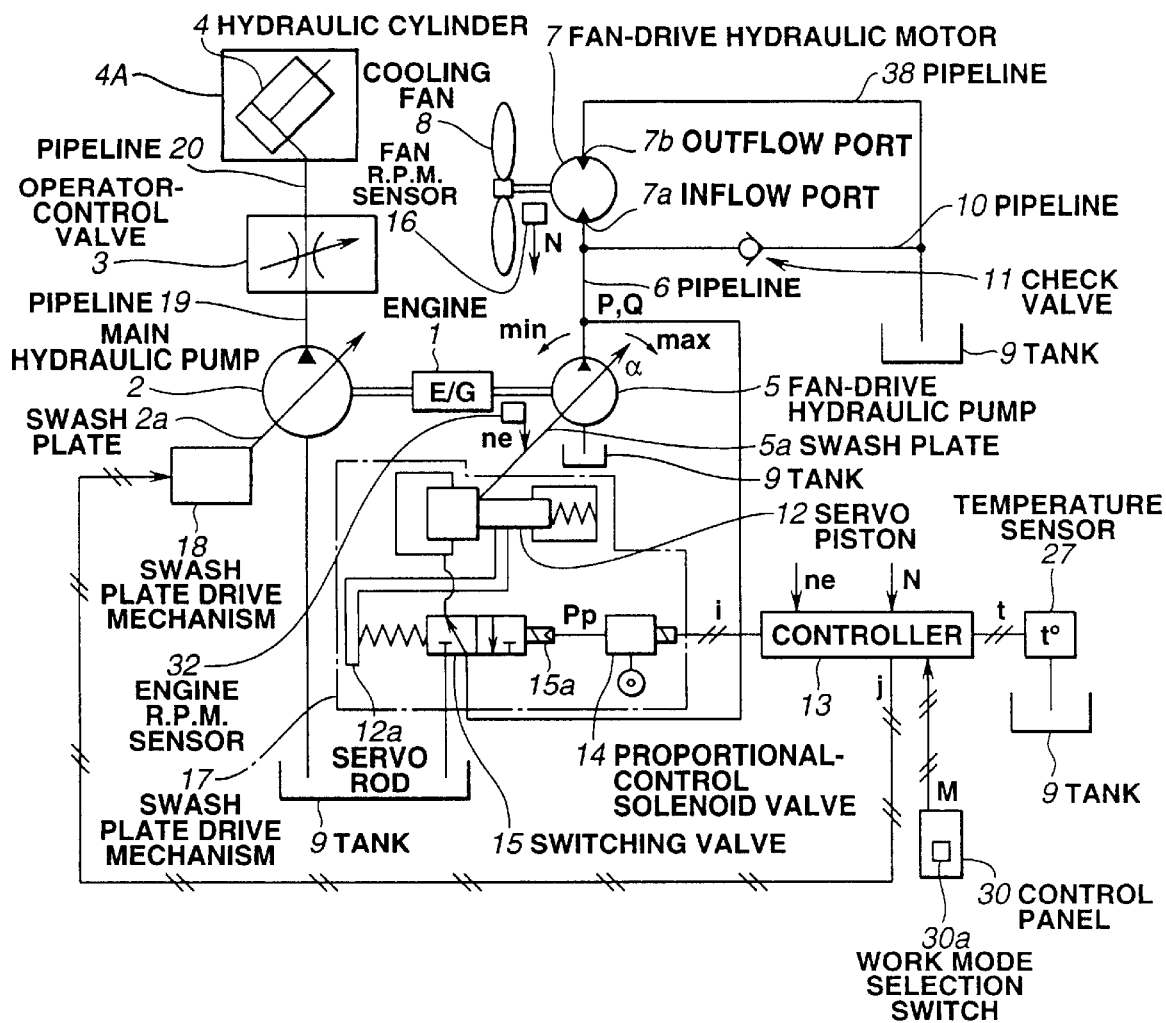
FIG. 1(a) is a hydraulic circuit diagram representing an embodying aspect of a cooling fan drive apparatus relating to the present invention.

The hydraulic circuit diagrammed in FIG. 1(a) in the drawings is deployed in construction machinery such as hydraulic shovels. When the subject of the application is construction machinery, the variable-capacity type main hydraulic pump 1 diagrammed in FIG. 1(a) constitutes a pressure oil supply source for supplying pressure oil to a hydraulic cylinder 4 for operating a boom, for example.

A main hydraulic pump 2 is driven by an engine 1 which constitutes a drive source. The main hydraulic pump 2 is configured as a swash plate type piston pump, for example. By varying the angle of a swash plate 2a in the main hydraulic pump 2, the stroke volume (capacity) (cc/rev) of the main hydraulic pump 2 is varied.

The stroke volume (capacity) of the main hydraulic pump 2 is varied when a swash plate drive mechanism 18 is activated.

The main hydraulic pump 2 takes in pressure oil from a tank 9 and discharges pressure oil from a pressure oil discharge port. The pressure oil discharged from the main hydraulic pump 2 is supplied via a pipeline 19 to a control valve 3.

The control valve 3 has a variable restriction therein. The flow volume of pressure oil discharged from the main hydraulic pump 2 is controlled by changes made in the aperture area of the variable restriction in response to control amounts input by a control lever (not shown). That is, the control valve 3 functions as a flow volume control valve. The pressure oil discharged from the main hydraulic pump 2 for which the flow volume is controlled by the control valve 3 is supplied to the hydraulic cylinder 4 via a pipeline 20. This hydraulic cylinder 4 is driven by the supply of the pressure oil to the hydraulic cylinder 4. Working equipment (a boom) (not shown) is activated when the hydraulic cylinder 4 is driven. The control valve 3 not only controls the pressure oil flow volume, but also functions as a direction switching valve to switch the direction of supply of pressure oil for the hydraulic cylinder 4.

A fan-drive hydraulic pump 5 is also provided separately from the main hydraulic pump 2 for supplying pressure oil to the hydraulic cylinder 4 for the working equipment noted above. This fan-drive hydraulic pump 5 is a variable-capacity type hydraulic pump. The fan-drive hydraulic pump 5 is the hydraulic drive oil source for a cooling fan 8.

The fan-drive hydraulic pump 5 is driven by the engine 1. The fan-drive hydraulic pump 5 is configured as a swash plate piston pump, for example. When the angle of the swash plate 5a of the fan-drive hydraulic pump 5 is varied, the stroke volume (capacity) q (cc/rev) of the fan-drive hydraulic pump 5 is varied. An engine R.P.M. sensor 32 is deployed at the drive shaft of the engine 1 for the purpose of detecting the R.P.M. $n_e$ of the engine 1, that is, the input R.P.M. $n_e$ for the fan-drive hydraulic pump 5.

The stroke volume (capacity) q of the fan-drive hydraulic pump 5 is varied by the driving of a swash plate drive mechanism 17.

The fan-drive hydraulic pump 5 intakes pressure oil from the tank 9 and discharges pressure oil from the pressure oil discharge port at a pressure P and flow volume Q (liters/min). The pressure oil discharged from the fan-drive hydraulic pump 5 is supplied to an inflow port 7a in a fan-drive hydraulic motor 7 via a pipeline 6. The fan-drive hydraulic motor 7 is a fixed-capacity type hydraulic motor.

The cooling fan 8 is attached to the drive shaft of the fan-drive hydraulic motor 7. A fan R.P.M. sensor 16 is deployed at that drive shaft of the fan-drive hydraulic motor 7 for detecting the R.P.M. N of the cooling fan 8. The fan-drive hydraulic motor 7 is rotationally driven by the flowing in through the inflow port 7a of pressure oil discharged from the fandrive hydraulic pump 5, whereupon the cooling fan 8 is turned. Pressure oil flowing out from an outflow port 7b in the fan-drive hydraulic motor 7 passes through a pipeline 38 and is returned to the tank 9.

The tank 9 and the inflow port 7a of the fan-drive hydraulic motor 7 communicate via a pipeline 10. A check valve 11 is deployed in the pipeline 10 so that pressure oil can only flow in one direction, i.e. from the tank 9 to the inflow port 7A of the fan-drive hydraulic motor 7.

This check valve 11 is called the intake valve. The intake valve is a valve for preventing cavitation with the supply of flow volume from the tank when the motor acts as a pump, as when the speed of the motor rapidly decreases, and the pressure drops.

Accordingly, in the hydraulic circuit of this embodying aspect, when the speed of the fan-drive hydraulic motor 7 rapidly declines, together with the pressure oil that is discharged from the fan-drive hydraulic pump 5, pressure oil from the tank 9 is directed to the inflow port 7a of the fan-drive hydraulic motor 7 via the check valve 11. Thus cavitation can be prevented from developing in cases such as when a very rapid change in pressure occurs.

The temperature t of the actuation pressure oil inside the tank 9 is detected by a temperature sensor 27.

In a control panel 30 is provided a work mode selection switch 30a for selecting a work mode M from among any of various work modes corresponding to various types of work performed by the hydraulic shovel.

To a controller 13 are input signals representing the fan R.P.M. N detected by the fan R.P.M. sensor 16, the temperature t detected by the temperature sensor 27, the engine R.P.M. $n_e$ detected by the engine R.P.M. sensor 32, and the work mode M selected by the work mode selection switch 30a. Based on these input signals, the controller 13 generates an electric-current command i. This electric-current command i is input to the swash plate drive mechanism 17 and the swash plate drive mechanism 17 is drive-controlled thereby.

The swash plate drive mechanism 17 comprises a servo piston 12, proportionalcontrol solenoid valve 14, and switching valve 15.

The servo piston 12 drives the swash plate 5a in the fan-drive hydraulic pump 5 which is a capacity control member for varying the swash plate angle α. The servo piston 12 moves to positions corresponding to the tilt angle of the swash plate 5a, that is, to the stroke volume q of the fan-drive hydraulic pump 5, in conjunction wherewith the position of a servo rod 12a is changed. In conjunction with the movement of the servo rod 12a, the force of a spring acting on the switching valve 15 changes.

The switching valve 15 is a valve that is switched between a valve position for supplying pressure oil (i.e. pressure oil discharged from fan-drive hydraulic pump 5) to the large-diameter end of the servo piston 12 and a valve position for returning pressure oil to the tank 9 from the large-diameter end of the servo piston 12, in response to an input pilot pressure Pp.

The proportional-control solenoid valve 14 receives as inputs the electric-current commands i output by the controller 13, whereby the valve positions are changed, and applies pilot pressure oil at a pilot pressure Pp corresponding to the electric current valve i to a pilot port in the switching valve 15.

Accordingly, when a electric-current command i corresponding to a swash plate angle α in the fan-drive hydraulic pump 5 is output to the proportional-control solenoid valve 14, pilot pressure oil at the pilot pressure Pp corresponding to that electric-current command i is applied to the pilot port in the switching valve 15. The switching valve 15 is driven so as to assume the valve position corresponding to the pilot pressure Pp applied. The servo piston 12 is driven by pressure oil flowing in and out according to the valve position of the switching valve 15, whereupon the swash plate la is moved either to the minimum capacity side MIN or the maximum capacity side MAX. The swash plate angle α in the fan-drive hydraulic motor 5 is thereby varied in response to the electric-current command i output from the controller 13.

The swash plate drive mechanism 18 that drives the swash plate 2a in the main hydraulic pump 2 also comprises configuring elements similar to the swash plate drive mechanism 17 described above. This swash plate drive mechanism 18 also effects drive-control as does the swash plate drive mechanism 17, in response to electric-current commands j output from the controller 13.

Next, the operations performed with the hydraulic circuit diagrammed in FIG. 1(a) are described, focusing on the processing executed by the controller 13 indicated in FIG. 1(a).

In the controller 13 memory are stored target fan R.P.M. values Na required by the cooling fan 8, associated with various temperatures t in the tank 9. When the cooling fan 8 is turned at a target fan R.P.M. Na corresponding to the temperature t, the actuation pressure oil is optimally cooled. The correlation between the temperature t and the target fan R.P.M. values Na is determined by simulation or experimentation, etc.

In conjunction with the embodying aspect diagrammed in FIG. 1(a), a case was described wherein the temperature of the actuation pressure oil is made the subject of temperature detection and the actuation pressure oil is made the object of cooling and cooled by the cooling fan 8. However, the subject of temperature detection may be the temperature of the radiator water, or the temperature of air that has passed through the radiator. Application can also be made in cases where both the actuation pressure oil and the engine 1 (coolant) are made the object of cooling and cooled, depending on the deployment of such components as the radiator or oil cooler.

In such cases, the engine 1 is cooled by a coolant circulating through a water jacket. The coolant, after removing heat from the engine 1, is sent to the radiator, cooled by blowing air generated by the cooling fan 8 described earlier, and returned to the water jacket in the engine 1. In the case where the engine 1 is a forced-air-cooled engine, the engine 1 is cooled directly by the blowing air generated by the cooling fan 8.

In cases where both the engine 1 and the actuation pressure oil are cooled by the cooling fan 8, the temperatures t detected can include the coolant temperature (water temperature) t1, detected by a temperature sensor like the temperature sensor 27, as well as the temperature t2 in the tank 9.

For that case, the correlations between the coolant temperature t1 required for cooling, the tank temperature t2, and the target fan R.P.M. Na are plotted in FIG. 4.

Figure 4:
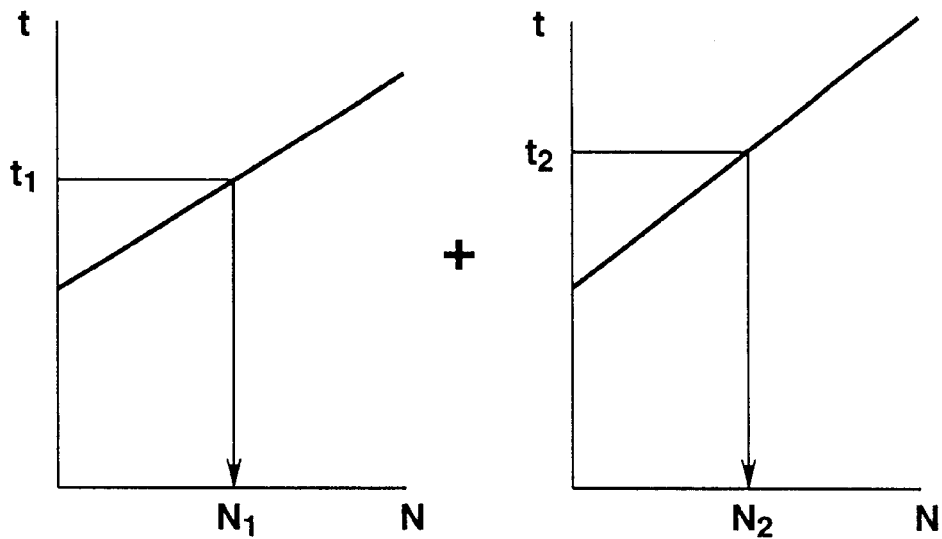
FIG. 4 is a set of graphs for describing the relationship between the temperature of an object substance and a target fan R.P.M.

Specifically, as graphed in FIG. 4, the correlation between the coolant temperature t1 and the target fan R.P.M. N1 is preset, and the correlation between the tank temperature t2 and the target fan R.P.M. N2 is also preset. Thereupon, the target fan R.P.M. N1 corresponding to the current coolant temperature t1 can be found, and the target fan R.P.M. N2 corresponding to the current tank temperature t2 can also be found. The higher of these target fan R.P.M. values N1 and N2 so found, namely the R.P.M. MAX (N1, N2), is then made the final target fan R.P.M. Na. Also, things other than the coolant and tank noted in the foregoing may be made the object of cooling. In such cases, the target fan R.P.M. Na necessary for cooling can be found by Na=MAX (N1, N2, N3, . . . , etc.), when the target fan R.P.M. values found for each of the cooling objects are N1, N2, N3, . . . , etc.

Figure 5:
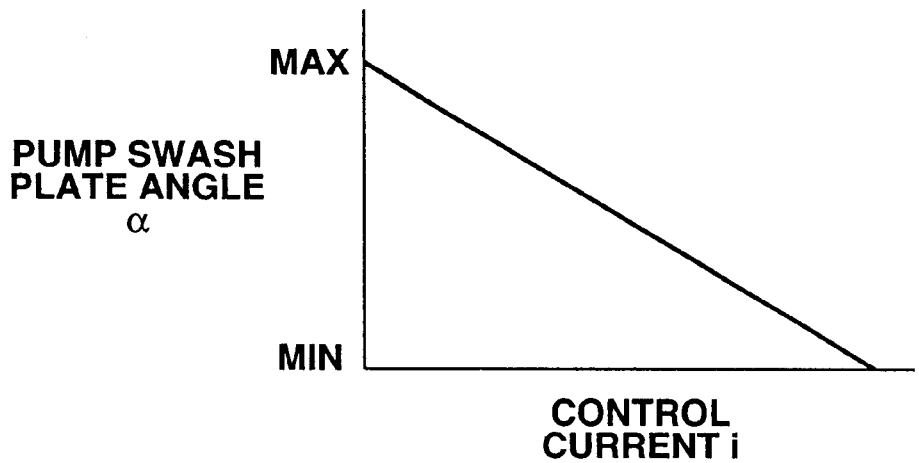
FIG. 5 is a graph exemplifying the relationship between an electric control current and a pump swash plate angle.
Figure 6:
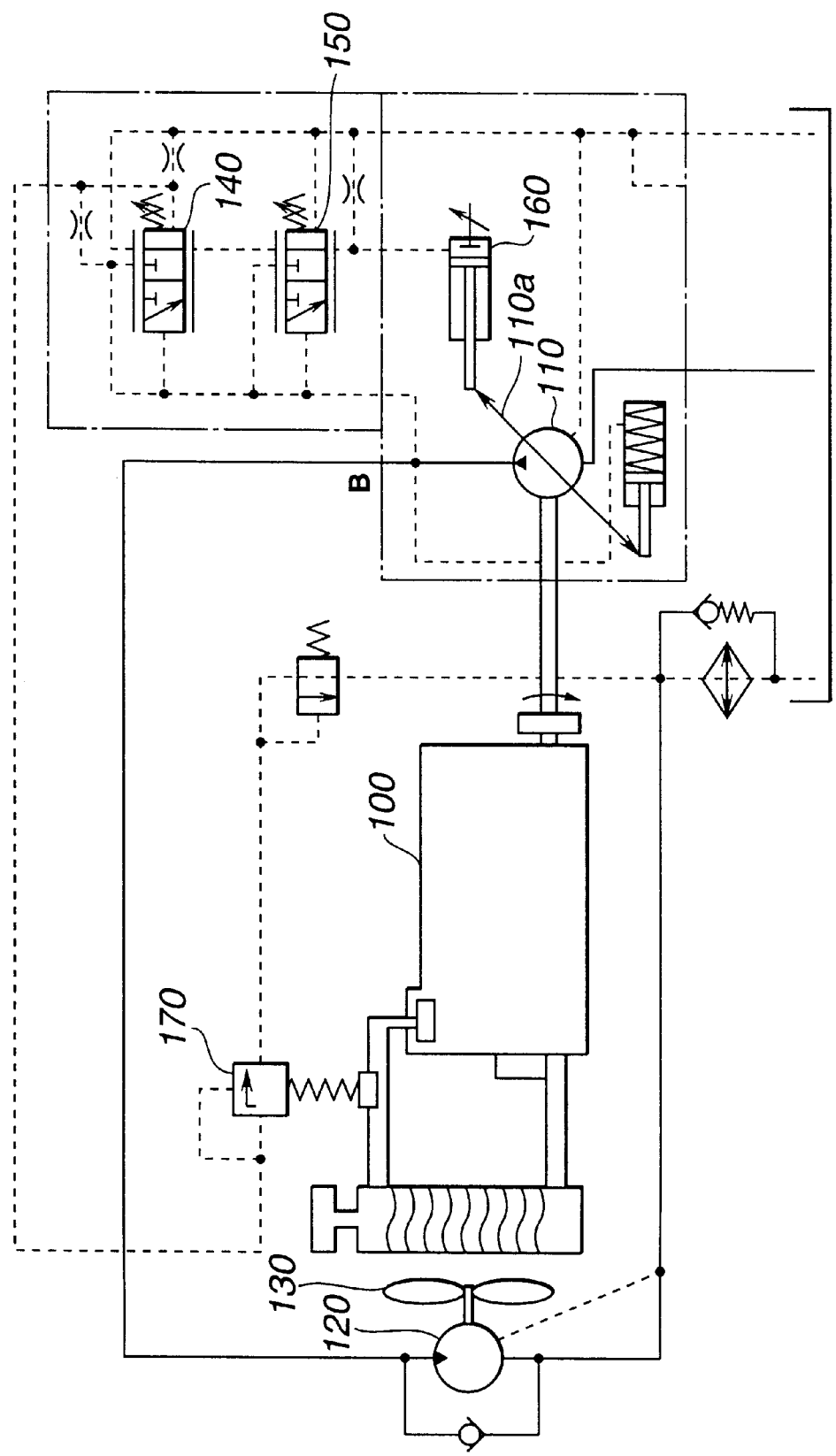
FIG. 6 is a diagram representing prior art.

FIG. 5 is a plot of the correlation between the swash plate angle α in the fan-drive hydraulic pump 5 and the control current i input from the controller 13 to the proportional-control solenoid valve 14. As plotted in FIG. 5, in this embodying aspect, it is assumed that the relationship between the control current i and the pump swash plate angle α is a linear relationship.

As described in the foregoing, when the controller 13 determines the target fan R.P.M. Na corresponding to the temperature t (the actuation pressure oil temperature t1, for example) detected by the temperature sensor 27, it outputs to the proportional-control solenoid valve 14 in the swash plate drive mechanism 17 a current command i to cause the cooling fan 8 to be turned at that target fan R.P.M. Na.

A relationship is here established between the capacity q per revolution in the variable-capacity type fan-drive hydraulic pump 5, the flow volume Q of the pressure oil discharged thereby, and the R.P.M. $n_e$ input to the hydraulic pump 5 (i.e. the engine 1 R.P.M. $n_e$). This relationship is expressed in formula (2) below, where K is a constant.

$$Q = q \cdot n_e \cdot K \tag{2}$$

Accordingly, if a constant R.P.M. $n_e$ is supposed for the engine 1, then the flow volume Q will increase in direct proportion with the capacity q of the fan-drive hydraulic pump 5, that is, with the swash plate angle α thereof.

The fan-drive hydraulic motor 7, on the other hand, which intakes the pressure oil discharged by the fan-drive hydraulic pump 5, is a fixed-capacity type hydraulic pump. Accordingly, in direct proportion with increases in the flow volume Q taken in, the R.P.M. of the drive shaft of the fan-drive hydraulic motor 7, that is, the R.P.M. N of the cooling fan 8, also increases. That is, when the target fan R.P.M. Na for the cooling fan 8 is determined, the capacity q of the fan-drive hydraulic pump 5, that is, the swash plate angle α thereof, corresponding to that target fan R.P.M. Na is determined by a one-to-one correlation.

The controller 13, in the manner described earlier, computes a current command i to make the R.P.M. N of the cooling fan 8 the target fan R.P.M. Na, and outputs that current command i to the proportional-control solenoid valve 14 in the swash plate drive mechanism 17. As a consequence, the swash plate angle α of the swash plate 5a in the fan-drive hydraulic pump 5 is varied in correspondence with the target fan R.P.M. Na noted above. Thus from the fan-drive hydraulic pump 5 is discharged pressure oil in a flow volume Q corresponding to that target fan R.P.M. Na. As a result, into the fan-drive hydraulic motor 7 will flow pressure oil with a flow volume Q corresponding to that target fan R.P.M. Na. Thus the cooling fan 8 will be turned at the target fan R.P.M. Na and optimal cooling will be performed.

Hence, as based on this embodying aspect, the cooling fan 8 is turned so that its R.P.M. becomes a target fan R.P.M. Na corresponding with the detected temperature t, wherefore benefits are realized in that energy loss can be suppressed to a minimum and optimal cooling can be effected.

Furthermore, when controlling the R.P.M. of the cooling fan 8 as described in the foregoing with the controller 13, it is also permissible to employ the actual R.P.M. N of the cooling fan 8 detected by the fan R.P.M. sensor 16 as a feedback signal, and perform feedback control such that the deviation between the target fan R.P.M. Na and the actual fan R.P.M. N becomes zero. It is of course also permissible to control the fan R.P.M. with open-loop control wherewith the actual fan R.P.M. N detected by the fan R.P.M. sensor 16 is not used.

In the foregoing description, a correlation between a detected temperature t and a target fan R.P.M. Na is established, the target fan R.P.M. Na required by the current temperature t is determined from that correlation, and a control command i for obtaining that target fan R.P.M. Na is output from the controller 13. Instead of such control, however, a configuration may be implemented wherewith a correlation is established between a detected temperature t and a target discharge flow volume Qa for the fan-drive hydraulic pump 5, the target discharge flow volume Qa required by the current temperature 5 determined from that correlation, and a control command i for obtaining that target discharge flow volume Qa output from the controller 13.

In that case, the controller 13 computes a current command i for making the discharge flow volume Q of the fan-drive hydraulic pump 5 the target discharge flow volume Qa, and outputs that current command i to the proportional-control solenoid valve 14 in the swash plate drive mechanism 17. As a consequence, the swash plate angle α of the swash plate 5a in the fan-drive hydraulic pump 5 is varied in correspondence with the target discharge flow volume Qa, and pressure oil is discharged with precisely that target discharge flow volume Qa. As a result, pressure oil will flow into the fan-drive hydraulic motor 7 with that target discharge flow volume Qa. Thus the cooling fan 8 is turned at the fan R.P.M. Na in accordance with the target discharge flow volume Qa and optimal cooling is performed.

Now, in equation (2) above ($Q=q \cdot n_e \cdot K$), when the R.P.M. $n_e$ input to the fan-drive hydraulic pump 5 (i.e. the engine 1 R.P.M. $n_e$) fluctuates, the flow volume Q varies under the influence of the pump input R.P.M. $n_e$ in addition to the capacity q (swash plate angle $\alpha$) of the fan-drive hydraulic pump 5. Accordingly, neither the target discharge flow volume Qa nor the target fan R.P.M. Na needed for the detected temperature t can be determined from the capacity q of the fan-drive hydraulic pump 5 alone. The pump input R.P.M. $n_e$ parameter is also necessary.

That being so, when the engine R.P.M. $n_e$ fluctuates, the correlations between the detected temperature t, the detected engine R.P.M. $n_e$, and the target discharge flow volume Qa required therefor are preset in the controller 13. Alternatively, the correlations between the detected temperature t, the detected engine R.P.M. $n_e$, and the target fan R.P.M. Na required therefor are preset in the controller 13. In cases where the correlations between the detected temperature t, the detected engine R.P.M. $n_e$, and the target discharge flow volume Qa required therefor are preset in the controller 13, control is effected by the controller 13 in the following manner.

That is, the controller 13 finds the target discharge flow volume Qa required for the current detected temperature t and for the current detected engine R.P.M. $n_e$ from the established correlations, computes a current command i for obtaining that target discharge flow volume Qa, and outputs that current command i to the proportional-control solenoid valve 14 of the swash plate drive mechanism 17. As a consequence, the swash plate angle $\alpha$ of the swash plate 5a in the fan-drive hydraulic pump 5 is varied in correspondence with the target discharge flow volume Qa, and pressure oil is discharged with precisely that target discharge flow volume Qa. As a result, pressure oil will flow into the fan-drive hydraulic motor 7 with that target discharge flow volume Qa. Thus the cooling fan 8 is turned at the fan R.P.M. Na in accordance with the target discharge flow volume Qa and optimal cooling is performed.

Next is described a case where control is effected according to the work mode M selected by the work mode selection switch 30a.

The activation speed required in the working equipment (a boom, for example) will differ according to the work mode M selected by the work mode selection switch 30a on the control panel 30. When the work mode selected is fine control, for example, the working equipment must be activated at low speed. For this reason, it is necessary to reduce the flow volume supplied to the hydraulic cylinder 4 from the main hydraulic pump 2. At such times, the engine is sometimes controlled so that the R.P.M. $n_e$ thereof is reduced in order to reduce energy loss.

Conversely, when the work mode selected is excavation, for example, the working equipment must be activated at high speed. For this reason, it is necessary to increase the flow volume supplied to the hydraulic cylinder 4 from the main hydraulic pump 2. Accordingly, the engine must be controlled so that its R.P.M. $n_e$ increases by that measure. Thus the engine R.P.M. $n_e$ varies according to the work mode M.

That being so, when a work mode M is selected, the correlations between the detected temperature t, the selected work mode M, and the target discharge flow volume Qa required therefor are preset in the controller 13, as with the control described earlier for the case where the engine R.P.M. $n_e$ fluctuates. Alternatively, the correlations between the detected temperature t, the selected work mode M, and the target fan R.P.M. Na required therefor are preset in the controller 13. In cases where the correlations between the detected temperature 5, the selected work mode M, and the target discharge flow volume Qa required therefor are preset in the controller 13, control is effected by the controller 13 in the following manner.

That is, the controller 13 finds the target discharge flow volume Qa required for the current detected temperature 5 and for the currently selected work mode M from the established correlations, computes a current command i for obtaining that target discharge flow volume Qa, and outputs that current command i to the proportional-control solenoid valve 14 of the swash plate drive mechanism 17. As a consequence, the swash plate angle $\alpha$ of the swash plate 5a in the fan-drive hydraulic pump 5 is varied in correspondence with the target discharge flow volume Qa, and pressure oil is discharged with precisely that target discharge flow volume Qa. As a result, pressure oil will flow into the fan-drive hydraulic motor 7 with that target discharge flow volume Qa. Thus the cooling fan 8 is turned at the fan R.P.M. Na in accordance with the target discharge flow volume Qa and optimal cooling is performed.

As based on the embodying aspect diagrammed in FIG. 1(a) and described in the foregoing, an optimal target fan R.P.M. Na or target discharge flow volume Qa is determined from the current temperature t detection results, and a control command i for obtaining such target values is output from the controller 13 so as to drive-control the swash plate drive mechanism 17. For this reason, the air volume from the cooling fan 8 (R.P.M.) can be precisely controlled.

With the embodying aspect diagrammed in FIG. 1(a), moreover, the fan-drive hydraulic pump 5 is made a variable-capacity type hydraulic pump, and the fan-drive hydraulic motor 7 is made a fixed-capacity type hydraulic motor. Instead of that, however, a hydraulic circuit can be constructed wherein, as diagrammed in FIG. 1(b), the fan-drive hydraulic pump 5 is made a fixed-capacity type hydraulic pump, and the fan-drive hydraulic motor 7 a variable-capacity type hydraulic motor. The same symbols are used for the same configuring elements in FIG. 1(a) and 1(b) to avoid both duplicate diagramming and redundant description.

Figure 1B:
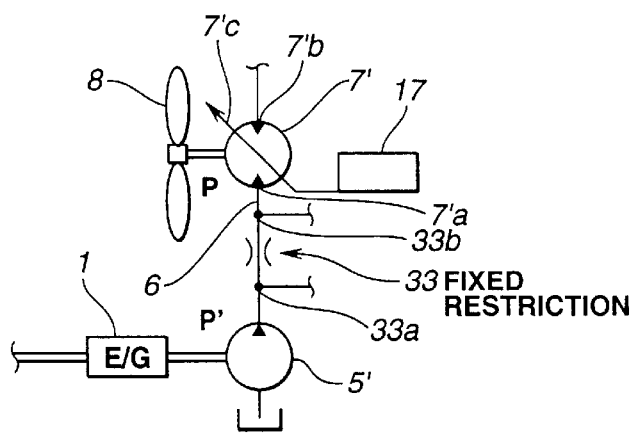
FIG. 1(b) is a hydraulic circuit diagram partially representing an example configuration wherein part of FIG. 1(a) has been modified.

When configured as diagrammed in FIG. 1(b), the swash plate 7c of the fan-drive hydraulic motor 7 is driven by the swash plate drive mechanism 17 as in the embodying aspect diagrammed in FIG. 1(a). That is, the swash plate drive mechanism 17 here is drive-controlled by the controller 17 as in the embodying aspect diagrammed in FIG. 1(a).

Also, a fixed restriction 33 is deployed in the pressure oil discharge pipeline 6 that connects the fixed-capacity fan-drive hydraulic pump 5 and the variable-capacity fan-drive hydraulic motor 7. The R.P.M. $n_e$ of the engine 1 (i.e. the R.P.M. $n_e$ input to the hydraulic pump 5 ) can be detected from the pressure differential P P between the detected pressures P and P detected at detection ports 33a and 33b before and after the fixed restriction 33. Accordingly, if this configuration is adopted, the engine R.P.M. sensor 32 need not be deployed.

More specifically, the R.P.M. $n_e$ input to the pump (engine 1 R.P.M. $n_e$) can be found from the pressure differential P P before and after the fixed restriction 33, and the optimal target fan R.P.M. Na can be determined from that R.P.M. A control command i for obtaining that target fan R.P.M. Na is output from the controller 13, and the swash plate drive mechanism 17 is drive-controlled. Thus the air volume from the cooling fan 8 (R.P.M.) can be precisely controlled according to variations in the R.P.M. $n_e$ of the engine 1.

An embodying aspect is described next wherewith the number of parts in the hydraulic machinery can be made even fewer than in the hydraulic circuits diagrammed in FIG. 1(a) and 1(b).

Figure 2:
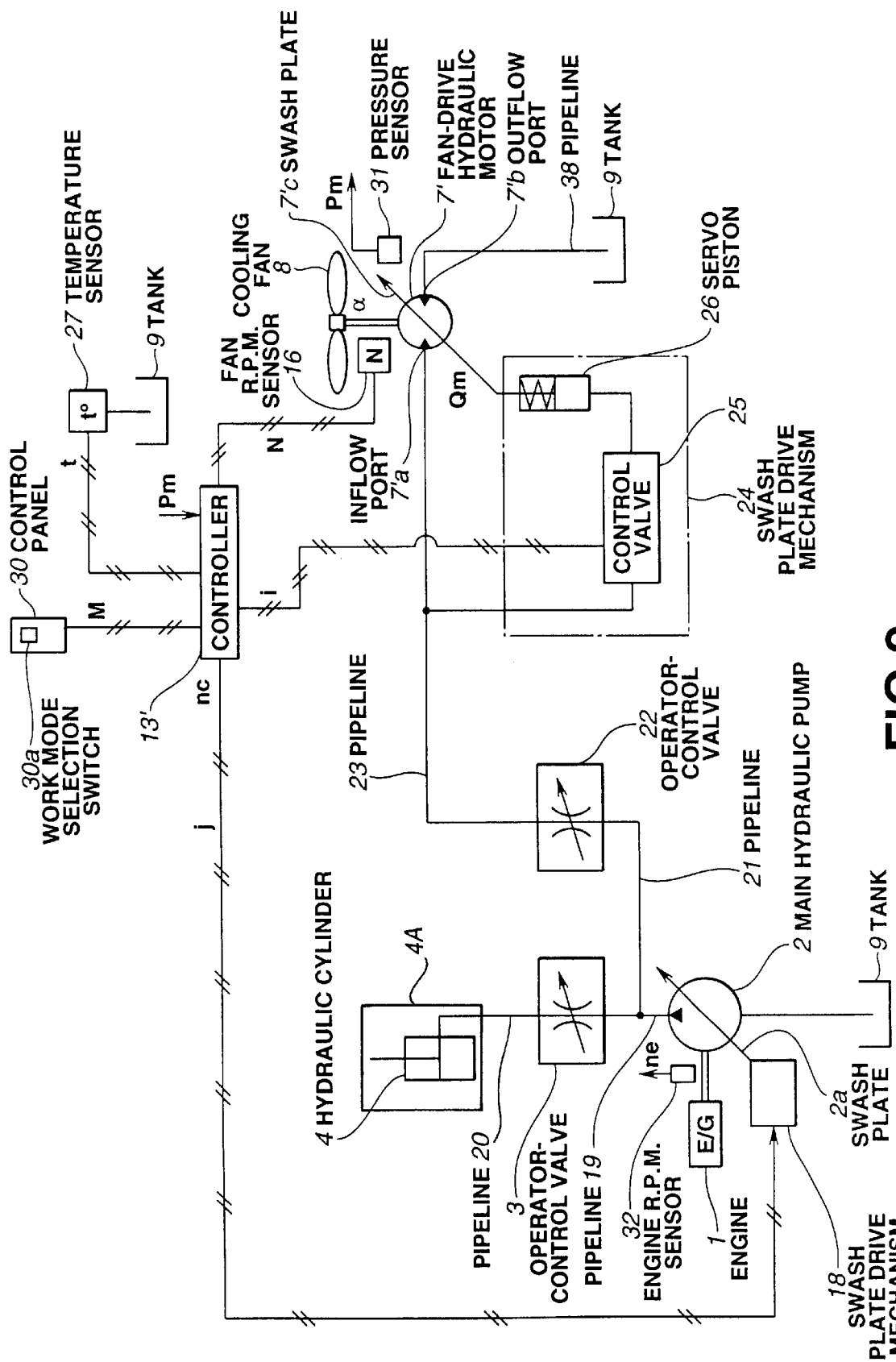
FIG. 2 is a hydraulic circuit diagram representing an embodying aspect of a cooling fan drive apparatus relating to the present invention.

This embodying aspect is diagrammed in FIG. 2.

Comparing the hydraulic circuits diagrammed in FIG. 1(a), 1(b), and 2, a point in common with all is that the cooling fan 8 is driven by a hydraulic drive source separate from the engine 1, but in the configuration diagrammed in FIG. 2, the deployment of dedicated fan-drive hydraulic pumps 5 and 5 seen in the configuration diagrammed in FIG. 1(a) and 1(b) is eliminated. Instead, a main hydraulic pump 2 already provided for driving work equipment is used as the hydraulic drive source for the cooling fan 8 and thus drives that cooling fan 8. Hereinafter, the same configuring elements are designated by the same symbols in FIG. 2 and in FIG. 1(a) and 1(2) to avoid redundant description.

In this embodying aspect, the main hydraulic pump 2 that supplies pressure oil to the hydraulic cylinder 4 for the working equipment is used as the hydraulic pump for driving the fan. This fan-drive main hydraulic pump 2 is a variable-capacity type hydraulic pump.

The main hydraulic pump 2 intakes pressure oil from the tank 9 and discharges pressure oil from a pressure oil discharge port. The pressure oil discharged from the main hydraulic pump 2 is supplied via a pipeline 21 to a control valve 3 and to a similar control valve 22. In general, the control valve 3 is housed inside a block or cartridge type frame together with a service valve in anticipation of additional utilization. Accordingly, the control valve 22 can be additionally used as a service valve. For this reason, no extensive structural alteration will be needed if a modification is later made wherewith a cooling fan drive apparatus (circuit) is added to the existing hydraulic circuit.

The control valve 22 has a variable restriction. The flow volume of pressure oil discharged from the main hydraulic pump 2 is controlled by changes made in the aperture area of the variable restriction in response to control amounts input by a control lever (not shown). That is, the control valve 22 functions as a flow volume control valve. The pressure oil discharged from the main hydraulic pump 2 for which the flow volume is controlled by the control valve 22 is supplied to the inflow port 7 in the fan-drive hydraulic motor 7 via a pipeline 23. The cooling fan 8 is attached to the drive shaft of the fan-drive hydraulic motor 7.

The fan-drive hydraulic motor 7 is a variable-capacity type hydraulic motor.

The capacity qm (cc/rev) of the fan-drive hydraulic motor 7 is varied by the activation of the swash plate drive mechanism 24.

The fan-drive hydraulic motor 7 intakes through an inflow port 7 the pressure oil discharged from the main hydraulic pump 2, turns the drive shaft at an output R.P.M. N, and thus turns the cooling fan 8. The pressure oil made to flow out from an outflow port 7b of the fan-drive hydraulic motor 7 passes through a pipeline 38 and returns to the tank 9.

An intake valve can also be deployed in the hydraulic circuit diagrammed in FIG. 2 as in the hydraulic circuit diagrammed in FIG. 1(a).

In such cases, in FIG. 2, as in FIG. 1(a), the tank 9 communicates with the outflow port 7a in the fan-drive hydraulic motor 7 by a pipeline 10. A check valve 11 is deployed in the pipeline 10 so that pressure oil can only flow in one direction, i.e. from the tank 9 to the inflow port 7a of the fan-drive hydraulic motor 7.

Accordingly, in the hydraulic circuit of this embodying aspect diagrammed in FIG. 2, if the fan-drive hydraulic motor 7 slows down suddenly, pressure oil from the tank 9 is routed through the check valve 11 in the pipeline 10, together with pressure oil discharged from the main hydraulic pump 2, to the inflow port 7a of the fan-drive hydraulic motor 7. Accordingly, the development of cavitation can be prevented in cases such as when a very rapid pressure fluctuation occurs.

The symbol Qm is now used to designate the flow volume of the pressure oil flowing through the fan-drive hydraulic motor 7, and the symbol Pm to designate the drive pressure.

Thereupon, a relationship is established between the capacity qm per revolution of the fan-drive hydraulic motor 7, the flow volume Qm (liters/min), and the output R.P.M. N (cooling fan 8 R.P.M. N). This relationship is expressed in formula (3) below, where k1 is a constant.

$$N = Qm/qm \cdot k1 \tag{3}$$

Also, the torque T absorbed by the fan-drive hydraulic motor 7 can be expressed as in formula (4) below using the capacity qm per revolution and the drive pressure Pm (kg/cm$^2$), where k2 is a constant.

$$T = Pm \cdot qm \cdot k2 \tag{4}$$

The drive pressure Pm for the fan-drive hydraulic motor 7 is detected by a pressure sensor 31.

To the controller 13 are input signals designating the pressure Pm detected by the pressure sensor 31, the fan R.P.M. N detected by the fan R.P.M. sensor 16, the temperature t detected by the temperature sensor 27, the engine R.P.M. $n_e$ detected by the engine R.P.M. sensor 32, and the work mode M selected by the work mode selection switch 30a. Based on these input signals, the controller 13 generates a current command i and outputs that current command i, thereby drive-controlling the swash plate drive mechanism 24.

The swash plate drive mechanism 24 comprises a servo piston 26 and a proportional-control solenoid valve 25.

The servo piston 26 is a capacity control member for driving the swash plate 7c of the fan-drive hydraulic motor 7 and varying the swash plate α. The servo piston 26 moves to positions corresponding to tilt angles of the swash plate 7c, that is, to capacities qm of the fan-drive hydraulic motor 7.

The proportional-control solenoid valve 25 receives as input the current command i output from the controller 13, whereby the valve position is varied, and pressure oil is supplied to the servo piston 26 in a flow volume corresponding to the current value i.

Accordingly, when a current command i corresponding to a swash plate angle α in the fan-drive hydraulic pump 5 is output to the proportional-control solenoid valve 25 from the controller 13, the valve position of the proportional-control solenoid valve 25 is activated so that it is switched to the valve position corresponding to that current command i. To the servo piston 26, pressure oil is made to flow in, in a flow volume corresponding to the valve position to which the proportional-control solenoid valve 25 is switched, whereby the swash plate 7c is activated and moved either to the minimum capacity side or to the maximum capacity side. Thus the swash plate angle α in the fan-drive hydraulic motor 7 is varied to a swash plate angle that corresponds to the current command i output from the controller 13.

The swash plate drive mechanism 18 that drives the swash plate 2a of the main hydraulic pump 2 comprises the same configuring elements as the swash plate drive mechanism 24 described earlier. The swash plate drive mechanism 18 is also drive-controlled in the same manner as the swash plate drive mechanism 24, in response to a current command j output by the controller 13.

The operations performed with the hydraulic circuit diagrammed in FIG. 2 are now described, focusing on the processing performed by the controller 13 indicated in FIG. 2.

First Control

The controller 13 performs constant torque control so that the torque T absorbed by the fan-drive hydraulic motor 7 becomes a certain absorbed torque value Ta. The reason for performing this constant torque control is now explained.

In general, the relationship expressed in formula (5) below, where k3 is a constant, is established between the torque T absorbed by a fan-drive hydraulic motor the R.P.M. N of a cooling fan.

$$T = k3 \cdot N^2 \quad (5)$$

In the case of the embodying aspect diagrammed in FIG. 1(a), the fan-drive hydraulic motor 7 is driven by the fan-drive hydraulic pump 5 provided separately from the main hydraulic pump 2 that drives the working equipment. For this reason, the torque absorbed by the fan-drive hydraulic motor 7 is not affected by the load on the working equipment or fluctuations in the aperture area of the control valve 3. Accordingly, the torque T absorbed by the fan-drive hydraulic motor 7 is maintained comparatively stably at a constant value. Therefore, as is evident from formula (5) above, fluctuations in the R.P.M. N of the cooling fan 8 can be suppressed and the turning thereof stabilized.

In the case of the embodying aspect diagrammed in FIG. 2, on the other hand, the main hydraulic pump 2 that drives the working equipment also functions as a fan-drive hydraulic pump to drive the fan-drive hydraulic motor 7. When the aperture area of the control valve 22 fluctuates, however, this results in fluctuations in the flow volume supplied to the fan-drive hydraulic motor 7. For this reason, the torque T absorbed by the fan-drive hydraulic motor 7 will be affected by the load on the working equipment and fluctuations in the aperture area of the control valve 22, and hence will not stabilize. Accordingly, as is evident from formula (5) above, the R.P.M. N of the cooling fan 8 will fluctuate and the turning thereof will not stabilize.

Thus there arises a need to suppress fluctuations in the R.P.M. N of the cooling fan 8 and stabilize the turning thereof. To that end, control is effected to maintain the torque T absorbed by the fan-drive hydraulic motor 7 at a certain value Ta.

In specific terms, a certain torque value Ta is set in the controller 13 as a target torque value. Then, from formula (4) given earlier (T=Pm·qm·k2), the capacity qm required to obtain the certain torque value Ta is calculated, based on the drive pressure Pm at the fan-drive hydraulic motor 7 as currently detected. Then the current value i needed to obtain that calculated capacity qm is computed.

When the current command i for achieving the certain absorbed torque value Ta has been computed, as described above, this current command i is output to the proportional-control solenoid valve 25 in the swash plate drive mechanism 24. As a result, the swash plate 7c in the fan-drive hydraulic motor 7 is changed to a swash plate angle α corresponding to the calculated capacity qm. Thus the torque T absorbed by the fan-drive hydraulic motor 7 is made to coincide with the certain torque value Ta. As a result of that, fluctuations in the R.P.M. N of the cooling fan 8 are suppressed and the turning thereof stabilizes.

Second Control

Target fan R.P.M. values Na needed for the cooling fan 8 are stored in memory in the controller 13, associated with temperatures t in the tank 9. When the cooling fan 8 is turned at the target fan R.P.M. Na corresponding to the temperature t, the actuation pressure oil is optimally cooled. The correlation between these temperatures t and target fan R.P.M. values Na is determined by simulation or experimentation, etc.

The embodying aspect diagrammed in FIG. 2 has been described in terms of a case where cooling is done with the cooling fan 8, with the temperature of the actuation pressure oil as the subject of temperature detection and the actuation pressure oil as the object of cooling. The subject of the temperature detection, however, may be the radiator water temperature or the temperature of the air that has passed through the radiator. Application can also be made in cases where both the actuation pressure oil and the engine 1 (coolant) are made the object of cooling and cooled, depending on the deployment of such components as the radiator or oil cooler.

In a case where both the engine 1 and the actuation pressure oil are cooled by the cooling fan 8, the coolant temperature (water temperature) t1 can be detected, in addition to the tank 9 temperature t2, by a temperature sensor like the temperature sensor 27.

In that case, the correlations between the coolant temperature t1 required for cooling, the tank temperature t2, and the target fan R.P.M. Na are as plotted in FIG. 4.

When the target fan R.P.M. Na corresponding to the temperature t (the actuation pressure oil temperature t2, for example) detected by the temperature sensor 27 is determined by the controller 13 as described in the foregoing, the controller 13 outputs a current command i for turning the cooling fan 8 at that target fan R.P.M. Na to the proportional-control solenoid valve 25 in the swash plate drive mechanism 24.

Here the relationship expressed in formula (3) given earlier (N=Qm/qm·k1) is established for the variable-capacity fan-drive hydraulic motor 7.

Accordingly, if it can be assumed that the flow volume Qm supplied to the hydraulic motor 7 from the main hydraulic pump 2 is constant, then the fan R.P.M. N will vary in direct proportion with the capacity qm of the fan-drive hydraulic motor 7, that is, with the swash plate angle α therein. In other words, once the target fan R.P.M. Na for the cooling fan 8 is determined, the capacity qm of the fan-drive hydraulic motor 7, which is to say the swash plate angle α therein, corresponding to that target fan R.P.M. Na is determined on a one-to-one basis, and, corresponding thereto, the current command i that should be output from the controller 13 is also determined on a one-to-one basis.

The controller 13, in the manner described in the foregoing, computes a current command i for making the R.P.M. N of the cooling fan 8 the target fan R.P.M. Na, and outputs that current command i to the proportional-control solenoid valve 25 in the swash plate drive mechanism 24. As a result, the swash plate 7c in the fan-drive hydraulic motor 7 is changed to a swash plate angle α that corresponds to that target fan R.P.M. Na. Thus the cooling fan 8 is turned at the target fan R.P.M. Na and optimal cooling is performed.

As based on this embodying aspect, described in the foregoing, the cooling fan 8 is turned at a target fan R.P.M. Na corresponding to the detected temperature t, wherefore the benefits are gained of being able to suppress energy loss to the minimum and performing optimal cooling.

Furthermore, when controlling the R.P.M. of the cooling fan 8 as described in the foregoing with the controller 13, it is also permissible to employ the actual R.P.M. N of the cooling fan 8 detected by the fan R.P.M. sensor 16 as a feedback signal, and perform control such that the deviation between the target fan R.P.M. Na and the actual fan R.P.M. N becomes zero. It is of course also permissible to control the fan R.P.M. with open-loop control wherewith the actual fan R.P.M. N detected by the fan R.P.M. sensor 16 is not used.

If in formula (3) above (N=Qm/qm·k1) the flow volume Qm supplied to the fan-drive hydraulic motor 7 fluctuates, then the R.P.M. N will vary according to both parameters, namely to the capacity qm of and the flow volume Qm to the fan-drive hydraulic motor 7. Accordingly, the target fan R.P.M. Na required for the detected temperature t will not be established from only the capacity qm of the fan-drive hydraulic motor 7. The flow volume Qm parameter also becomes necessary. This flow volume Qm can be treated as variation in the engine R.P.M. $n_e$.

That being so, when the flow volume Qm does fluctuate, it is only necessary to set the correlations between the detected temperature t, the detected engine R.P.M. $n_e$, and the target fan R.P.M. Na required therefor in the controller 13.

In cases where the correlations between the detected temperature t, the detected engine R.P.M. $n_e$, and the target fan R.P.M. Na are set in the controller 13, control is effected by the controller 13 as follows.

That is, the controller 13 finds the target fan R.P.M. Na required for the current detected temperature t and for the current detected engine R.P.M. $n_e$ from the correlations set therein, computes a current command i for realizing that target fan R.P.M. Na, and outputs that current command i to the proportional-control solenoid valve 25 in the swash plate drive mechanism 24. As a result, the swash plate 7c in the fan-drive hydraulic motor 7 is changed to a swash plate angle α corresponding to that target fan R.P.M. Na. Thus the cooling fan 8 is turned at the target fan R.P.M. Na and optimal cooling is performed.

When a work mode M has been selected with the work mode selection switch 30a on the control panel 30, moreover, control is executed as described below.

That is, as when control is effected in the case where the engine R.P.M. $n_e$ fluctuates, described earlier, the correlations between the detected temperature t, selected work mode M, and target fan R.P.M. Na required therefor are preset in the controller 13.

The controller 13 finds the target fan R.P.M. Na required for the current detected temperature t and the currently selected work mode M from the correlations set therein, computes a current command i for realizing that target fan R.P.M. Na, and outputs that current command i to the proportional-control solenoid valve 25 in the swash plate drive mechanism 24. As a result, the swash plate 7c in the fan-drive hydraulic motor 7 is changed to a swash plate angle α corresponding to that target fan R.P.M. Na. Thus the cooling fan 8 is turned at the target fan R.P.M. Na and optimal cooling is performed.

As based on the embodying aspect diagrammed in FIG. 2, as described in the foregoing, unlike with the embodying aspect diagrammed in FIG. 1(a) and 1(b), the existing main hydraulic pump 2 used for driving the working equipment is used as the hydraulic pump for driving the fan, thereby eliminating the need to deploy the dedicated fan-drive hydraulic pumps 5 and 5. Accordingly, the number of parts in the hydraulic machinery can be even further reduced.

With the embodying aspect diagrammed in FIG. 2, furthermore, the pressure oil discharged from the main hydraulic pump 2 is supplied to the fan-drive hydraulic motor 7 via the control valve 22. An embodying aspect is also possible, however, wherein the deployment of the control valve 22 is eliminated.

Figure 3:
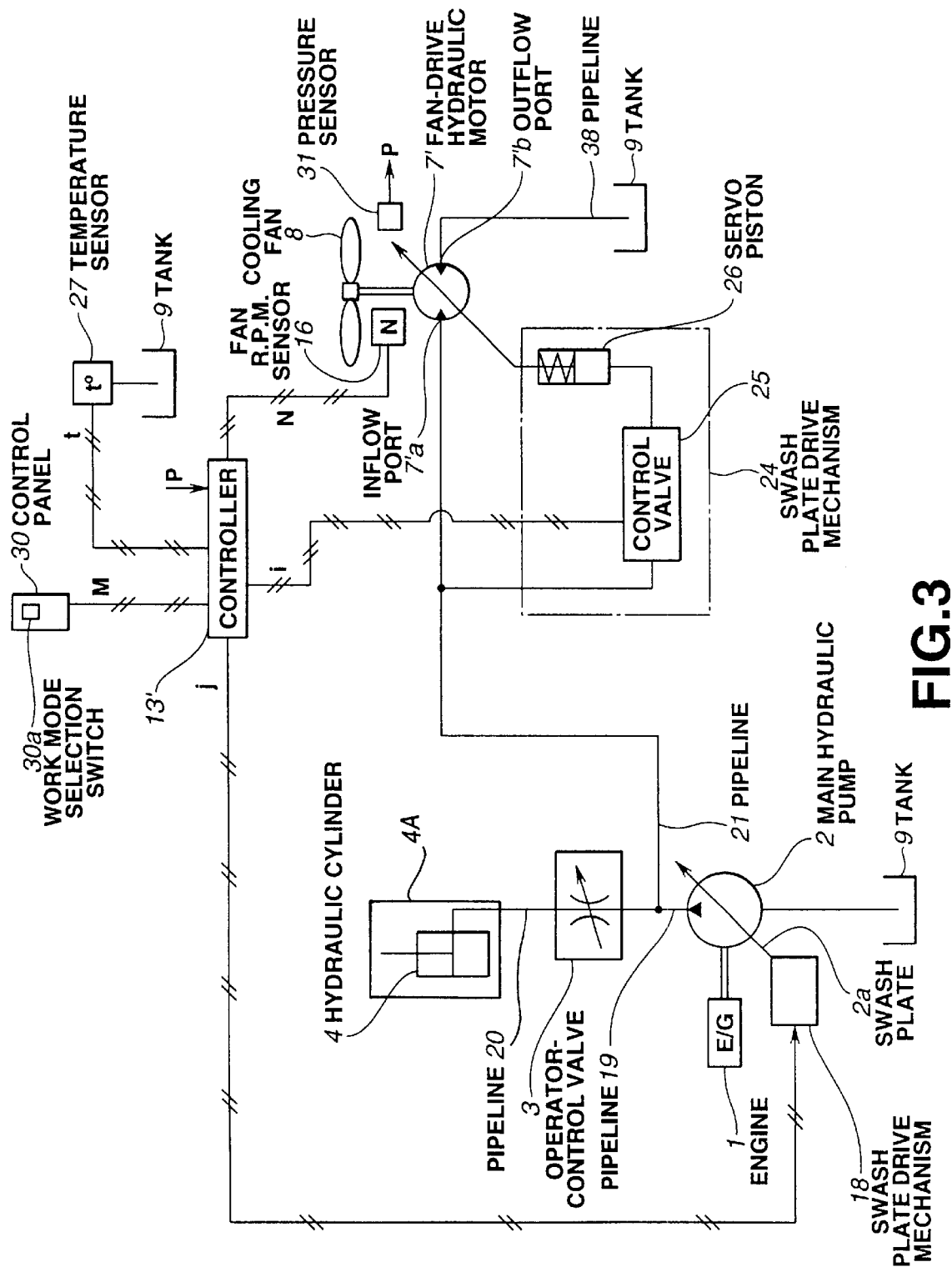
FIG. 3 is a hydraulic circuit diagram representing an example configuration wherein part of FIG. 2 has been modified.

That embodying aspect is diagrammed in FIG. 3. The same configuring elements are designated by the same symbols in FIG. 3 as in FIG. 2 to avoid redundant description.

When the configuration is made as diagrammed in FIG. 3, pressure oil discharged from the main hydraulic pump 2 is supplied directly to the fan-drive hydraulic motor 7 via a pipeline 21. The capacity qm of the fan-drive hydraulic motor 7 diagrammed in FIG. 3 is drive-controlled by the controller 13 as in the embodying aspect diagrammed in FIG. 2.

Next, an embodying aspect is described wherewith the number of parts in the hydraulic machinery can be reduced and the cooling fan R.P.M. can also be stabilized, as in the embodying aspect diagrammed in FIG. 2.

Figure 7:
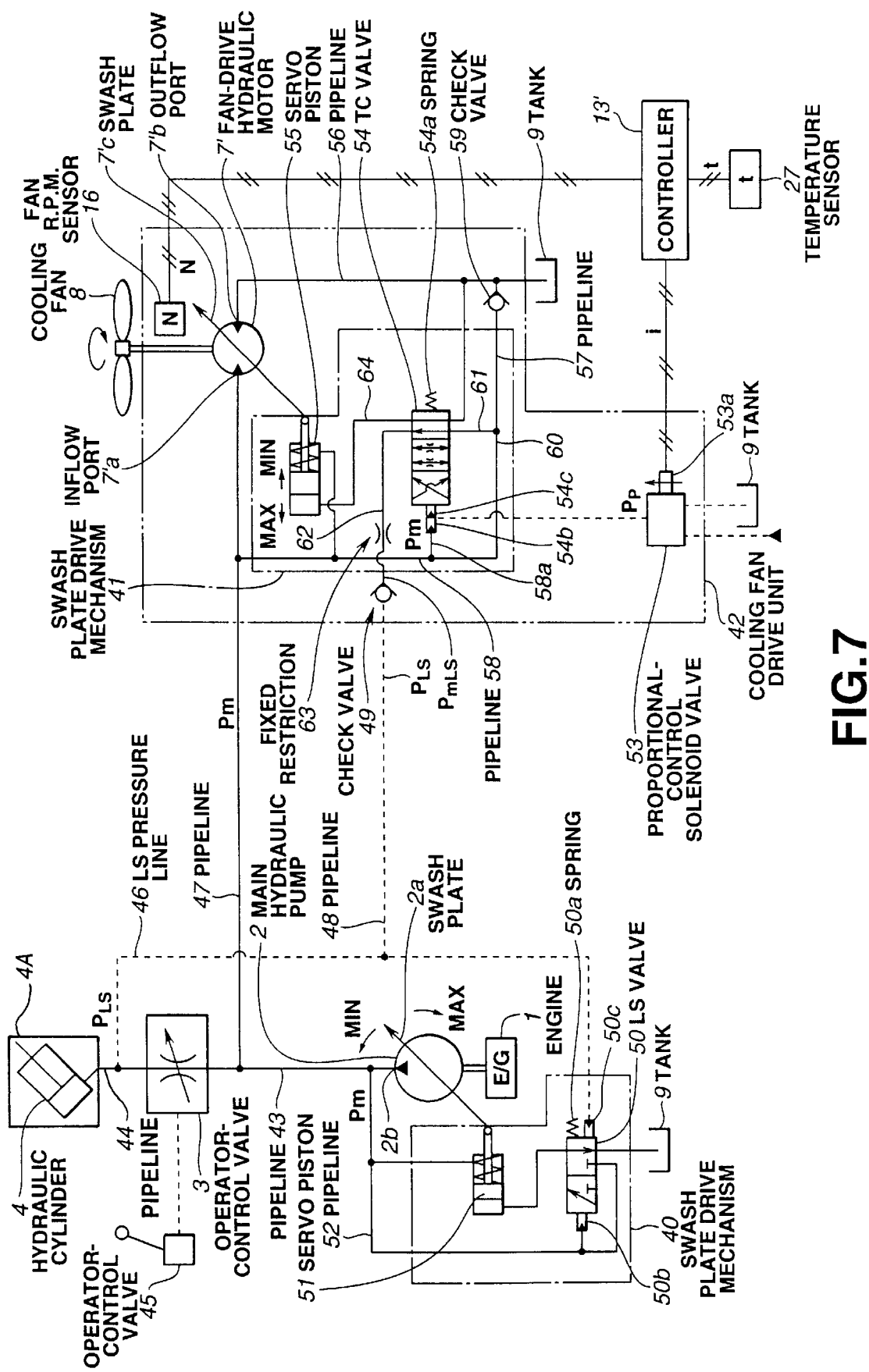
FIG. 7 is a hydraulic circuit diagram representing another embodying aspect of a cooling fan drive apparatus relating to the present invention.

This embodying aspect is diagrammed in FIG. 7.

The main hydraulic pump 2 is driven by the engine 1 acting as the drive source therefor. This main hydraulic pump 2 is configured, for example, as a swash plate type piston pump. The stroke volume (capacity) (cc/rev) of the main hydraulic pump 2 is varied by varying the swash plate 2a in the main hydraulic pump 2.

The stroke volume (capacity) of the main hydraulic pump 2 is varied when the swash plate drive mechanism 40 is driven.

The main hydraulic pump 2 takes in pressure oil from the tank 9 and discharges pressure oil at a discharge pressure Pm from a pressure oil discharge port 2b. The pressure oil discharged from the main hydraulic pump 2 is supplied to the control valve 3 via a pipeline 43.

The control valve 3 has a variable restriction. The flow volume of pressure oil discharged from the main hydraulic pump 2 is controlled by changes made in the aperture area of the variable restriction in response to control amounts input by a control lever 45. That is, the control valve 3 functions as a flow volume control valve. The pressure oil discharged from the main hydraulic pump 2 for which the flow volume is controlled by the control valve 3 is supplied to the hydraulic cylinder 4 via a pipeline 44. This hydraulic cylinder 4 is driven by the supply of the pressure oil to the hydraulic cylinder 4. Working equipment (a boom) (not shown) is activated when the hydraulic cylinder 4 is driven. The control valve 3 not only controls the pressure oil flow volume, but also functions as a direction switching valve to switch the direction of supply of pressure oil for the hydraulic cylinder 4.

The configuration of the swash plate drive mechanism 40 is described next.

To the swash plate drive mechanism 40 is connected both an LS pressure line 46 that branches from the pipeline 44, and the pipeline 44 that branches from the pipeline 43.

The swash plate drive mechanism 40 comprises a servo piston 51 for driving the swash plate 2a in the main hydraulic pump 2 and varying the pump capacity according to the flow volume of pressure oil flowing into it, and an LS valve 50 (load-sensing valve 50) for controlling the pressure oil flow volume according to the discharge pressure Pm of the main hydraulic pump 2 and the load pressure $P_{LS}$ on the hydraulic cylinder 4, and causing the pressure oil so controlled to flow into the servo piston 51.

The LS valve 50 effects control to maintain the pressure differential ΔP between the discharge pressure Pm of the main hydraulic pump 2 and the load pressure $P_{LS}$ on the hydraulic cylinder 4 (ΔP=Pm $P_{LS}$) at a first set pressure differential $ΔP_{LS}$. This control is called load-sensing control. The first set pressure differential $ΔP_{LS}$ is determined according to the force of a spring 50a acting on the LS valve 50.

More specifically, the pump discharge pressure Pm is applied via a pipeline 52 to a pilot port 50b in the LS valve 50. Meanwhile, the load pressure $P_{LS}$ is applied through an LS pressure line 46 to a pilot port 50c provided on the same side as the spring 50a in opposition to the pilot port 50b.

Accordingly, when the pressure differential Pm $P_{LS}$ is larger than the first set pressure differential $ΔP_{LS}$, the LS valve 50 is moved to the valve position on the left side as diagrammed in FIG. 7. Thus the pressure oil discharged from the pump is made to flow from the LS valve 50 to the servo piston 51, and the swash plate 2a in the main hydraulic pump 2 is moved to the minimum capacity side MIN. For this reason, the flow volume discharged from the main hydraulic pump 2 is decreased, and the discharge pressure Pm of the main hydraulic pump 2 becomes smaller. As a result, the pressure differential Pm $P_{LS}$ becomes smaller and is made to coincide with the first set pressure differential $ΔP_{LS}$. Conversely, when the pressure differential Pm $P_{LS}$ becomes smaller than the first set pressure differential $ΔP_{LS}$, the LS valve is moved to the valve position on the right. Thus pressure oil flows from the servo piston 51 through the LS valve 50 and out to the tank 9, and the swash plate 2a in the main hydraulic pump 2 is moved to the maximum capacity side MAX. For this reason, the flow volume discharged from the main hydraulic pump 2 is increased and the discharge pressure Pm of the pump becomes higher. As a result, the pressure differential Pm $P_{LS}$ becomes larger and is made to coincide with the first set pressure differential $ΔP_{LS}$. Hence the pressure differential Pm $P_{LS}$ is always maintained at the first set pressure differential $ΔP_{LS}$ by the LS valve.

In this embodying aspect, the main hydraulic pump 2 provided for driving the working equipment is used as the hydraulic drive source for the cooling fan 8, and the cooling fan 8 is driven thereby. In the hydraulic circuit diagrammed in FIG. 7, the portion enclosed by the double-dotted lines is a cooling fan drive unit 42. This cooling fan drive unit 42 can be constructed as an integrated unit (motor assembly).

The pump discharge pressure line 43 of the main hydraulic pump 2 is connected to a branch pipeline 47, and the branch pipeline 47 is connected to the cooling fan drive unit 42.

The LS pressure line 46 for detecting the load pressure $P_{LS}$ on the hydraulic cylinder 4 is connected to a branch pipeline 48, and the branch pipeline 48 is connected to the cooling fan drive unit 42.

The pipeline 47 communicates with the inflow port 7a in the fan-drive hydraulic motor 7. The cooling fan 8 is attached to the drive shaft of the fan-drive hydraulic motor 7. Hence the pressure oil discharged from the main hydraulic pump 2 is supplied via the pipelines 43 and 47 to the fan-drive hydraulic motor 7, and the cooling fan 8 is turned accordingly.

The fan-drive hydraulic motor 7 is a variable-capacity type hydraulic motor.

The capacity qm (cc/rev) of the fan-drive hydraulic motor 7 is varied by the swash plate drive mechanism 40 being driven.

The fan-drive hydraulic motor 7 takes in through the inflow port 7 the pressure oil discharged by the main hydraulic pump 2, turns the drive shaft with the output R.P.M. N, and thus turns the cooling fan 8. The pressure oil flowing out from the outflow port 7 of the fan-drive hydraulic motor 7 passes through a pipeline 56 and is returned to the tank 9. The drive pressure at the fan-drive hydraulic motor 7 is the discharge pressure Pm of the main hydraulic pump 2. The output R.P.M. of the fan-drive hydraulic motor 7, that is, the R.P.M. N of the cooling fan 8, is detected by the fan R.P.M. sensor 16.

The relationship expressed in formula (5), a described earlier, is here established between the torque T absorbed by the fan-drive hydraulic motor 7 and the R.P.M. N of the cooling fan 8, where k3 is a constant determined by the cooling fan 8.

$$T = k3 \cdot N^2 \tag{5}$$

Furthermore, the relationship expressed in equation (6) below is established between the capacity qm per revolution of the fan-drive hydraulic motor 7, the drive pressure Pm kg/cm$^2$), and the R.P.M. N of the cooling fan 8, where k4 is a constant.

$$Pm \cdot qm \cdot k4 = k3 \cdot N^2 \tag{6}$$

Additionally, the relationship expressed in formula (7) below is established between the capacity qm per revolution of the fan-drive hydraulic motor 7, and the flow volume Qm (liters/min) of the pressure oil supplied to the fan-drive hydraulic motor 7, where k5 is a constant.

$$Qm = N \cdot qm \cdot k5 \tag{7}$$

Therefore, as is evident from formula (5), equation (6), and formula (7) above, when the drive pressure Pm of and flow volume Qm at the fan-drive hydraulic motor 7 become high, the R.P.M. N of the cooling fan 8 becomes high. Also, in conjunction with the increase in the R.P.M. N of the cooling fan 8, the torque T absorbed by the fan-drive hydraulic motor 7 becomes greater.

Figure 10:
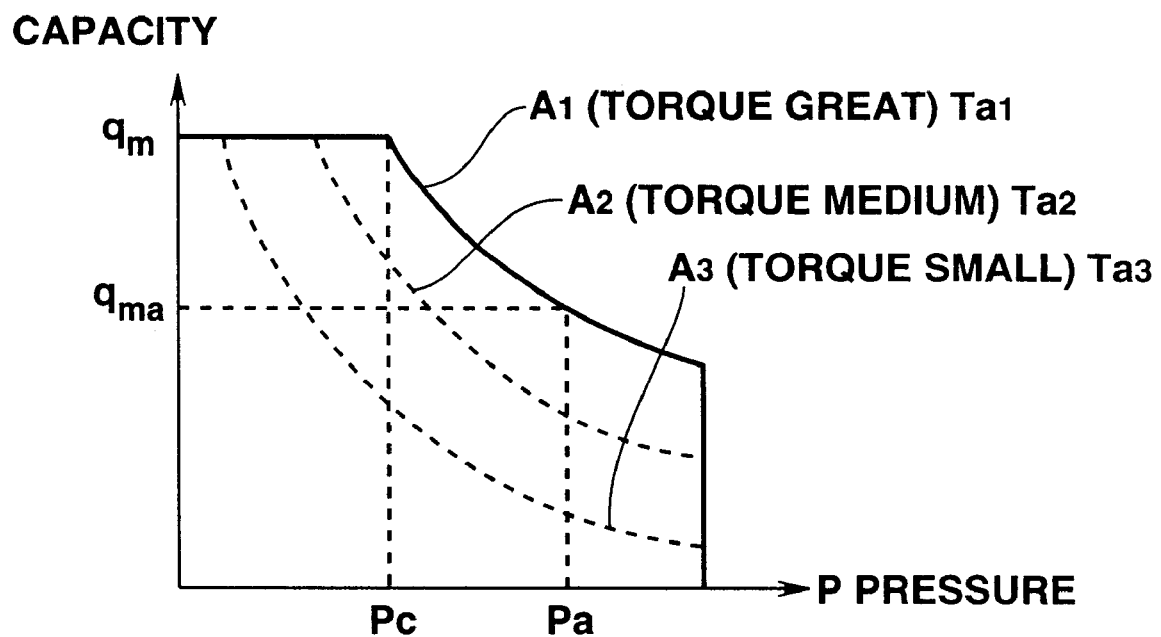
FIG. 10 is a graph representing the relationship between fan-drive hydraulic motor pressure and capacity.

In FIG. 10 are plotted the relationships between the fan-drive hydraulic motor 7 drive pressure Pm, capacity qm, and absorbed torque T. In FIG. 10, curve A1 represents the relationship between drive pressures Pm and capacities qm wherewith a large value for the set absorbed torque Ta1 is obtained. On this curve A1, the values of the set absorbed torque Ta1 are constant. Curve A2 represents the relationship between drive pressures Pm and capacities qm wherewith a medium-sized set absorbed torque Ta2 is obtained. On curve A2, the value of the set absorbed torque Ta2 is constant. And curve A3 represents the relationship between drive pressures Pm and capacities qm wherewith a small value for the set absorbed torque Ta3 is obtained. On this curve A3, the values of the set absorbed torque Ta3 are constant. Here, the set absorbed torque Ta1 is assumed to be the maximum torque.

The temperature sensor 27 detects the temperature t of the actuation oil in the tank 9.

The controller 13 inputs a signal indicting the temperature t detected by the temperature sensor 27 and a signal indicating the fan R.P.M. N detected by the fan R.P.M. sensor 16, generates a current command i for varying the set absorbed torque value Ta, and outputs that current command i to the cooling fan drive unit 42.

The proportional-control solenoid valve 53 in the cooling fan drive unit 42, the valve position whereof is varied by the input to an electromagnetic solenoid 53 of current commands i output from the controller 13, is a valve for applying to a pilot port 54c in a TC valve 54a pilot pressure Pp the size whereof corresponds to the current value i.

A swash plate drive mechanism 41 is configured mainly of a servo piston 55 for driving the swash plate 7c in the fan-drive hydraulic motor 7 and thus varying the capacity qm thereof according to the flow volume of the pressure oil made to flow in, and a TC valve 54 (torque control valve 54) for controlling the flow volume of pressure oil according to the discharge pressure Pm of the main hydraulic pump 1 (i. the drive pressure Pm at the fan-drive hydraulic motor 7) and the pilot pressure Pp output from the proportional-control solenoid valve 53, and causing the controlled pressure oil to flow into the servo piston 55.

The TC valve 54 is a valve for effecting control to maintain the drive pressure Pm at and capacity qm of the fan-drive hydraulic motor 7, that is, the absorbed torque T, at a set absorbed torque Ta. Specifically, the pump discharge pressure Pm is applied via pipelines 47, 58, and 58a to a pilot port 54b in the TC valve 54. The pilot pressure Pp is also applied via the proportional-control solenoid valve 53 to the pilot port 54c provided on the same side as the pilot port 54b. A spring 54a is deployed in the TC 54, on the side opposite the pilot ports 54b and 54c. The set absorbed torque value Ta is determined by the force of the spring 54a acting on the TC valve 54. It is assumed that the maximum absorbed torque value Ta1 is set by the spring 54a. The set absorbed torque value Ta, moreover, varies according to the pilot pressure Pp applied to the pilot port 54c in the TC valve 54.

The servo piston 55 and the TC valve 54 are connected by a pipeline 64. Pressure oil flows in and out through this pipeline 64 from the TC valve 54 to the servo piston 55.

The pipeline 47 communicates with the inflow port in the TC valve 54 via pipelines 58 and 61. The pump discharge pressure oil from the main hydraulic pump 2 is made to flow into the TC valve 54 via pipelines 47, 58, and 61.

The pipeline 48 is connected to a pipeline 62 through a check valve 49. The pipeline 62 is connected to the TC valve 54. A fixed restriction 63 is deployed in the pipeline 62. The check valve 49 is a valve for causing only pressure oil that has passed through the fixed restriction 63 to flow out on the pipeline 48 side. The pressure on the outflow side, which is to say the pipeline 48 side, of the check valve 49 is the load pressure $P_{LS}$. The pressure on the inflow side, which is to say the pipeline 62 side, of the check valve 49 is assumed to be $P_{mLS}$.

The tank 9 communicates with the inflow port 7a in the fan-drive hydraulic motor 7 via pipelines 60 and 47. In the pipeline 57 is deployed a check valve 59 for directing the pressure oil in the tank 9 only to the inflow port 7a in the fan-drive hydraulic motor 7.

The operations performed in the hydraulic circuit diagrammed in FIG. 7 are next described with a focus on the processing performed by the controller 13 indicated in FIG. 7.

Torque Control

The controller 13 performs constant torque control so that the torque T absorbed by the fan-drive hydraulic motor 7 becomes a certain absorbed torque value Ta. The reason for implementing constant torque control here was explained in conjunction with the embodying aspect diagrammed in FIG. 2.

Target fan R.P.M. values Na needed for the cooling fan 8 are stored in memory in the controller 13, associated with temperatures t in the tank 9. When the cooling fan 8 is turned at the target fan R.P.M. Na corresponding to the temperature t, the actuation pressure oil is optimally cooled. The correlation between these temperatures t and target fan R.P.M. values Na is determined by simulation or experimentation, etc.

In the embodying aspect diagrammed in FIG. 7, moreover, it is assumed that the temperature of actuation oil that actuates a hydraulic cylinder 4, etc., is cooled by a cooling fan 8, but applications are also possible, of course, wherein both the actuation oil and the engine 1 (coolant) are cooled.

In such cases, the engine 1 is cooled by a coolant circulating through a water jacket. The coolant, after removing heat from the engine 1, is sent to the radiator, cooled by blowing air generated by the cooling fan 8 described earlier, and returned to the water jacket in the engine 1. In the case where the engine 1 is a forced-air-cooled engine, the engine 1 is cooled directly by the blowing air generated by the cooling fan 8.

The present invention can also be applied in cases where only the engine 1 is cooled by the cooling fan 8 without cooling the actuation oil.

In cases where both the engine 1 and the actuation oil are cooled by the cooling fan 8, the temperatures t detected can include the coolant temperature (water temperature) t1, detected by a temperature sensor like the temperature sensor 27, as well as the temperature t2 in the tank 9.

For that case, the correlations between the coolant temperature t1 required for cooling, the tank temperature t2, and the target fan R.P.M. Na are plotted in FIG. 4. The explanation for FIG. 4 has already been given above.

As described in the foregoing, when the controller 13 determines the target fan R.P.M. Na corresponding to the temperature t (the actuation oil temperature t1, for example) detected by the temperature sensor 27, the target adsorbed torque Ta corresponding to that target fan R.P.M. Na is found according to formula (5), given earlier ($T=K3 \cdot N^2$). Then the current command i required for setting the absorbed torque Ta so found with the TC valve 54 is output to the proportional-control solenoid valve 53.

Now, if it is here assumed that the current command i is a command that sets the maximum absorbed torque value Ta1, the pilot pressure Pp applied to the TC valve 54 from the proportional-control solenoid valve 53 is turned off. The operation of the TC valve 54 at this time is now described.

Now, if the drive pressure Pm of the hydraulic motor 7 (pump discharge pressure Pm) applied to the pilot port 54b of the TC valve 54 is greater than the spring force generated by the spring 54a, the TC valve 54 is pushed to the right side in the drawing and positioned in the valve position on the left side in the drawing. Thus pressure oil flows into the servo piston 55 via the pipeline 64 from the TC valve 54. For this reason, the servo piston 55 is moved to the minimum capacity side MIN and the swash plate 7c in the fan-drive hydraulic motor 7 is driven to the minimum capacity side. As a result, the capacity qm of the fandrive hydraulic motor 7 is diminished.

If, on the other hand, the drive pressure Pm of the hydraulic motor 7 (pump discharge pressure Pm) applied to the pilot port 54b in the TC valve 54 is smaller than the spring force generated by the spring 54a, the TC valve 54 is pushed to the left side in the drawing and positioned in the valve position on the right side in the drawing. Thus pressure oil is discharged from the servo piston 55 through the pipeline 64 and the TC valve 54. For this reason, the servo piston 55 is moved to the maximum capacity side MAX and the swash plate 7c in the fan-drive hydraulic motor 7 is driven to the maximum capacity side. As a result, the capacity qm of the fan-drive hydraulic motor 7 is increased.

However, if the drive pressure Pm of the hydraulic motor 7 (pump discharge pressure Pm) applied to the pilot port 54b in the TC valve 54 balances the spring force generated by the spring 54a, the TC valve 54 is positioned in the middle valve position. When the TC valve 54 is positioned in this middle valve position, the pressure oil discharged from the main hydraulic pump 2 passes via the pipeline 61 through the restriction inside the TC valve 54, and thereafter passes through the fixed restriction 63 in the pipeline 62. As a result, the discharge pressure Pm of the main hydraulic pump 2 will be made to flow into the check valve 49 after being reduced to the pressure $P_{mLS}$.

In this manner, the drive pressure Pm and capacity qm values for the fan-drive hydraulic motor 7 will be made to vary on curve A1 in FIG. 10, and the product of the drive pressure Pm and capacity qm for the fan-drive hydraulic motor 7 will be made to coincide with the set absorbed torque Ta1.

If the target fan R.P.M. Na is set at a lower R.P.M., a current command i will be output from the controller 13 to the proportional-control solenoid valve 53 for effecting the lower set absorbed torque Ta2 or the even lower absorbed torque Ta3. For that reason, the pilot pressure Pp applied from the proportional-control solenoid valve 53 to the TC valve 54 will be increased.

At that time, the pilot pressure Pp applied to the pilot port 54c in the TC valve 54 will increase, wherefore the spring force generated by the spring 54a deployed in opposition to that pilot port 54c will be intensified. As a consequence, the lower absorbed torque value Ta2 or the even lower absorbed torque value Ta3 will be set with the TC valve 54.

Accordingly, in cases where a current command i for effecting the set absorbed torque Ta2 is output from the controller 13, the drive pressure Pm and capacity qm values for the fan-drive hydraulic motor 7 will be made to vary along curve A2 in FIG. 10, and the product of the drive pressure Pm and capacity qm for the fan-drive hydraulic motor 7 will be made to coincide with the set absorbed torque Ta2. And if a current command i for effecting the set absorbed torque Ta3 is output, the drive pressure Pm and capacity qm values for the fan-drive hydraulic motor 7 will be made to vary along curve A3 in FIG. 10, and the product of the drive pressure Pm and capacity qm for the fan-drive hydraulic motor 7 will be made to coincide with the set absorbed torque Ta3.

In the manner described in the foregoing, the torque T absorbed by the fan-drive hydraulic motor 7 is maintained at a constant set absorbed torque value of Ta1, Ta2, or Ta3. As a result, fluctuations in the R.P.M. N of the cooling fan 8 are suppressed and the turning thereof stabilizes.

Incidentally, to the inflow port 7a in the fan-drive hydraulic motor 7 is sent, together with the pressure oil that is discharged from the main hydraulic pump 2, pressure oil from the tank 9 via pipelines 57, 60, 58, and 47, being passed through the check valve 59. Thus cavitation can be prevented from developing in cases such as when a very rapid change in pressure occurs.

Furthermore, when controlling the R.P.M. of the cooling fan 8 as described in the foregoing with the controller 13, it is also permissible to employ the actual R.P.M. N of the cooling fan 8 detected by the fan R.P.M. sensor 16 as a feedback signal, and perform control such that the deviation between the target fan R.P.M. Na and the actual fan R.P.M. N becomes zero. It is of course also permissible to control the fan R.P.M. with open-loop control wherewith the actual fan R.P.M. N detected by the fan R.P.M. sensor 16 is not used.

Next are described operations according to the manner in which the working equipment is being activated. In the descriptions that follow, it is assumed that Ta1 is set as the set absorbed torque T.

(a) Case where cooling fan and working equipment are multiply activated and load on working equipment is light:

A case will now be considered wherein the cooling fan 8 and working equipment activated by the hydraulic cylinder 4 are multiply activated and the load on the working equipment is light.

Load-sensing control is being performed with the LS valve 50 on the main hydraulic pump 2 side to make the pressure differential ΔP between the discharge pressure Pm of the main hydraulic pump 2 and the load pressure $P_{LS}$ on the hydraulic cylinder 4 the first set pressure differential. The main hydraulic pump 2 here is a hydraulic drive source common to both the hydraulic cylinder 4 and the fan-drive hydraulic motor 7. For that reason the following problem arises.

If a condition is now assumed wherein the aperture of the restriction in the control valve 3 is closed and the load on the hydraulic cylinder 4 (load on working equipment) is light, the load pressure $P_{LS}$ at the hydraulic cylinder 4 will become low. Accordingly, when load-sensing control is performed, the discharge pressure Pm of the main hydraulic pump 2 will become low in conjunction with the drop in the load pressure $P_{LS}$ on the hydraulic cylinder 4. Accordingly, the flow volume supplied to the fan-drive hydraulic motor 7 from the main hydraulic pump 2 will be insufficient. Hence it will not be possible to secure the minimum torque required to turn the fan-drive hydraulic motor 7.

Thereupon, with this embodying aspect, the minimum torque required for turning the fan-drive hydraulic motor 7 is secured in the following manner.

That is, the pressure on the outflow side of the check valve 49 is the load pressure $P_{LS}$ on the hydraulic cylinder 4, while the pressure on the inflow side of the check valve 49 is $P_{mLS}$. This pressure $P_{mLS}$ is a pressure that roughly coincides with the discharge pressure of the main hydraulic pump 2 (load pressure at the fan-drive hydraulic motor 7) Pm.

Under conditions wherein the load on the hydraulic cylinder 4 (working equipment load) is light, the pressure $P_{mLS}$ is higher than the load pressure $P_{LS}$, so the pressure oil from the check valve 49 exhibiting the pressure $P_{mLS}$ will flow out to the pipeline 48, pass through the pipeline 48 and the LS pressure line 46, and be applied to the pilot port 50c of the LS valve 50. Furthermore, another member can be employed in place of the check valve 49 so long as it is able to select the larger pressure from among the load pressure $P_{LS}$ and the pressure $P_{mLS}$ and direct that larger pressure to the LS valve 50, in the same way as the check valve 49.

For this reason, load-sensing control is performed with the LS valve 50 to make the pressure differential between the discharge pressure of the main hydraulic pump 2 and the pressure $P_{mLS}$ selected as noted above the first set pressure differential. The selected pressure $P_{mLS}$ is higher than the load pressure $P_{LS}$ on the hydraulic cylinder 4, so the discharge pressure PM of the main hydraulic pump 2 will rise in conjunction therewith. Accordingly, the drive pressure Pm on the fan-drive hydraulic motor 7 will increase. That is, the drive pressure Pm on the fan-drive hydraulic motor 7 will increase to Pc as plotted in FIG. 10. When the drive pressure Pc of the hydraulic motor 7 acting on the pilot port 54b of the TC valve 54 balances the spring force generated by the spring 54a, the TC valve 54 is positioned in the middle valve position. When the TC valve 54 is positioned in this middle valve position, the pressure oil discharged from the main hydraulic pump 2 passes through the restriction in the TC valve 54 and the fixed restriction 63. As a result, the discharge pressure Pc of the main hydraulic pump 2, after being reduced to the pressure $P_{mLS}$, is made to flow out from the check valve 49 and is applied to the pilot port 50c in the LS valve 50.

In this way, the fan-drive hydraulic motor 7 is matched to the absorbed torque with a pressure Pc, and the minimum torque required for turning the fan-drive hydraulic motor 7 is secured. Meanwhile, load-sensing control is performed with the LS valve 50 on the main hydraulic pump 2 side using a pressure $P_{mLS}$ that is higher than the load pressure $P_{LS}$ on the hydraulic cylinder 4.

(b) Case where cooling fan is activated alone:

A case will now be considered wherein only the cooling fan 8 is activated, and the working equipment activated by the hydraulic cylinder 4 is not being operated. In this case also, the fan-drive hydraulic motor 7 is matched with the pressure Pc, as in case (a) above involving multiple activation, and the minimum torque required for turning the fan-drive hydraulic motor 7 is secured. On the other hand, the condition is such here that a higher pressure $P_{mLS}$ than the load pressure $P_{LS}$ on the hydraulic cylinder 4 is applied to the pilot port 50c in the LS valve 50 on the main hydraulic pump 2 side.

(c) Case where cooling fan and working equipment are multiply activated and load on working equipment is great:

The case is now considered where the cooling fan 8 and the working equipment activated by the hydraulic cylinder 4 are multiply activated and the load on the working equipment is great.

Load-sensing control is performed with the LS valve 50 on the main hydraulic pump 2 side to make the pressure differential ΔP between the discharge pressure Pm of the main hydraulic pump 2 and the load pressure $P_{LS}$ on the hydraulic cylinder 4 the first set pressure differential.

If we assume now a condition wherein the aperture of the restriction in the control valve 3 is opened and the load on the hydraulic cylinder 4 (working equipment load) is great, the load pressure $P_{LS}$ on the hydraulic cylinder 4 will become high. Accordingly, when load-sensing control is effected with the LS valve 50, the discharge pressure Pm of the main hydraulic pump 2 rises in conjunction with increases in the load pressure $P_{LS}$ on the hydraulic cylinder 4. The drive pressure Pm at the fan-drive hydraulic motor 7 will therefore increase. That is, the drive pressure Pm at the fan-drive hydraulic motor 7 will increase to Pa as plotted in FIG. 10. In conjunction therewith the capacity qm of the fan-drive hydraulic motor 7 will decline to qma. When the drive pressure Pa of the hydraulic motor 7 applied to the pilot port 54b in the TC valve 54 is balanced with the spring force of the spring 54a, the TC valve 54 will be positioned in the middle valve position. At this time, the capacity qm of the fan-drive hydraulic motor 7 will be set to qma. When the TC valve 54 is positioned in the middle valve position, the pressure oil discharged by the main hydraulic pump 2 will pass through the restriction inside the TC valve 54 and the fixed restriction 63. The pressure on the outflow side of the check valve 49 is the load pressure $P_{LS}$ on the hydraulic cylinder 4, and the pressure on the inflow side of the check valve 49 is $P_{mLS}$.

Under conditions where the load on the hydraulic cylinder 4 (working equipment load) is great, the load pressure $P_{LS}$ is higher than the pressure $P_{mLS}$, wherefore the pressure oil from the check valve 49 exhibiting a pressure $P_{mLS}$ will not flow out to the pipeline 48. Thus load-sensing control is effected with the LS valve 50 to make the pressure differential ΔP between the discharge pressure Pm of the main hydraulic pump 2 and the load pressure $P_{LS}$ on the hydraulic cylinder 4 the first set pressure differential.

In this way, the fan-drive hydraulic motor 7 is matched with the pressure Pa, and the fan-drive hydraulic motor 7 is driven with the constant absorbed torque Ta1. Meanwhile, load-sensing control is performed with the LS valve 50 on the main hydraulic pump 2 side using the load pressure $P_{LS}$ on the hydraulic cylinder 4.

As based on the embodying aspect diagrammed in FIG. 7, as described in the foregoing, the cooling fan 8 R.P.M. (air volume) is controlled by drive-controlling the swash plate drive mechanism 41 to vary the capacity (swash plate 7c) of the variable-capacity fan-drive hydraulic motor 7. The swash plate drive mechanism 41 has a structure that comprises a servo piston and a control valve. Accordingly, the hydraulic circuit can be constructed using the same kind of swash plate drive mechanism that is used to drive swash plates in main hydraulic pumps used in ordinary working equipment. That being so, it is possible to provide cooling fan drive apparatuses that exhibit high general usefulness.

As based on this embodying aspect, moreover, an existing main hydraulic pump 2 for driving working equipment can be used as the hydraulic pump for driving a fan, wherefore no deployment of a dedicated fan-drive hydraulic pump is necessary. Thus the number of parts in the hydraulic machinery can be reduced.

As based on this embodying aspect, furthermore, the torque control valve 54 is drive-controlled in response to a command i for making the torque T absorbed by the fan-drive hydraulic motor 7 a set absorbed torque value Ta. As a consequence, the absorbed torque T is maintained at the constant set torque value Ta even under conditions where the torque T absorbed by the fan-drive hydraulic motor 7 fluctuates. As a result, fluctuation in the R.P.M. N of the cooling fan 8 is suppressed and the turning thereof stabilizes.

As based on this embodying aspect, furthermore, a benefit is gained in that, even under conditions wherein the flow volume supplied to the fan-drive hydraulic motor 7 from the main hydraulic pump 2 is insufficient, the minimum torque required for turning the fan-drive hydraulic motor 7 is secured.

Another embodying aspect is now described with reference to FIG. 8. The same configuring elements are designated by the same symbols in this figure as in FIG. 7, thus avoiding redundant description.

In a control panel 30 is provided a work mode selection switch 30a for selecting a work mode M from among any of various work modes, that is, of various types of work performed by a hydraulic shovel. The discharge pressure Pm of the main hydraulic pump 2 is detected by a pressure sensor 84. Signals indicating the work mode M selected by the work mode selection switch 3A and signals indicating the pressure Pm detected by the pressure sensor 84 are input to the controller 13.

In this embodying aspect, a flow volume control valve 69 is deployed in the pipeline between the pressure oil discharge port 2b in the main hydraulic pump 2 and the outflow port 7a in the fan-drive hydraulic motor 7.

The main hydraulic pump 2 intakes pressure oil from the tank 9 and discharges pressure oil from the pressure oil discharge port 2b. The pressure oil discharged by the main hydraulic pump 2 is supplied to the flow volume control valve 69 via a pipeline 47a and the control valve 3. In general, the control valve 3 is housed inside a block or cartridge type frame together with a service valve in anticipation of additional utilization. Accordingly, the flow volume control valve 69 can be additionally used as a service valve. For this reason, no extensive structural alteration will be needed if a modification is later made wherewith a cooling fan drive apparatus (circuit) is added to the existing hydraulic circuit.

The flow volume control valve 69 has a variable restriction, and controls the flow volume of the pressure oil discharged from the main hydraulic pump 2 when the aperture area Ar thereof is varied in response to the pilot pressure Pp output from the proportional-control solenoid valve 68. The pressure oil discharged from the main hydraulic pump 2 the flow volume whereof is controlled by the flow volume control valve 69 is supplied to the inflow port 7a in the fan-drive hydraulic motor 7 via a pipeline 47b.

The controller 13 generates current commands i based on signals input thereto and outputs these current commands i to the proportional-control solenoid valve 68. Pilot pressure oil at a pilot pressure Pp corresponding to the current command i thus input is output from the proportional-control solenoid valve 68, and applied to a pilot port 69a in the flow volume control valve 69 via a pilot pressure line 70. The flow volume control valve 69 is driven by the application of the pilot pressure Pp to the pilot port 69a. It is also permissible to provide an electromagnetic solenoid in the flow volume control valve 69 as a solenoid valve and provide direct drive-control for the flow volume control valve 69 in response to electrical signals output from the controller 13.

The pressure on the pressure oil made to flow into the flow volume control valve 69 is made Pm (i.e. the discharge pressure of the main hydraulic pump 2), and the pressure on the pressure oil made to flow out from the flow volume control valve 69 is made $P_{mLS}$ (i.e. the load pressure at the fan-drive hydraulic motor 7). Accordingly, the pressure differential before and after the flow volume control valve 69 will be $\Delta Pm$ ($=Pm\ P_{mLS}$).

The pressure oil inflow port in the flow volume control valve 69 is connected to the pressure oil discharge port in a fixed-capacity hydraulic pump 71 via a pipeline 72. The fixed-capacity hydraulic pump 71 can be configured by a gear pump, for example. The fixed-capacity hydraulic pump 71 is driven by the engine 1. In the pipeline 72 is placed a check valve 73 that allows the pressure oil discharged from the fixed-capacity hydraulic pump 71 to flow only in a direction wherewith it is made to flow into the flow volume control valve 69. To the pressure oil discharge port of the fixed-capacity hydraulic pump 71 are connected a relief valve 74 and an unloading valve 75. The relief valve 74 and unloading valve 75 are connected by a pipeline 76.

The pressure oil outflow port of the flow volume control valve 69, on the other hand, is connected to an LS pressure line 46 via pipelines 47b and 48. In the pipeline 48 are deployed a fixed restriction 63 and check valve 49 as in FIG. 7. The pressure on the inflow side of the check valve 49 becomes $P_{mLS}$. The pressure on the outflow side of the check valve 49 is the load pressure $P_{LS}$ on the hydraulic cylinder 4. The pressure oil outflow port in the flow volume control valve 69 is connected to the tank 9 via pipelines 47b, 66, and 56. A relief valve 67 is placed in the pipeline 66.

The tank 9 and the inflow port 7a in the fan-drive hydraulic motor 7 are connected by pipelines 56 and 65. A check valve 90 is deployed in the pipeline 65 to direct pressure oil only in the direction from the tank 9 toward the inflow port 7 in the fan-drive hydraulic motor 7.

The configuration of the swash plate drive mechanism 41 that drives the swash plate 7c in the fan-drive hydraulic motor 7 is described next The swash plate drive mechanism 41 comprises a servo piston 55 that drives the swash plate 7c in the fan-drive hydraulic motor 7 in response to the flow volume of the pressure oil made to flow in, thus varying the capacity qm, and an LS valve 77 (load sensing valve 77) for controlling the pressure oil flow volume according to the inflow pressure Pm (discharge pressure Pm of the main hydraulic pump 2) of the flow volume control valve 69 applied to the pilot port and the outflow pressure $P_{mLS}$ (load pressure $P_{mLS}$ on the fan-drive hydraulic motor 7) of the flow volume control valve 69, and causing the pressure oil so controlled to flow into the servo piston 55. In other words, the swash plate drive mechanism 41 has the same configuration as the swash plate drive mechanism 40 on the main hydraulic pump 2 side.

The LS valve 77 performs load-sensing control to maintain the pressure differential $\Delta Pm$ between the pressure Pm (main hydraulic pump 2 discharge pressure) of the pressure oil flowing into the flow volume control valve 69 and the pressure $P_{mLS}$ (fan-drive hydraulic motor 7 load pressure) of the hydraulic flowing out from the flow volume control valve 69 ($\Delta Pm=Pm\ P_{mLS}$) a second set pressure differential $\Delta P_{mLS}$. The second set pressure differential $\Delta P_{mLS}$ is determined according to the force of the spring 77a acting on the LS valve 77.

More specifically, the inflow pressure Pm (main hydraulic pump 2 discharge pressure Pm) at the flow volume control valve 69 is applied to the pilot port 77b in the LS valve 77 via pipelines 47a, 72, 78, and 79. The outflow pressure $P_{mLS}$ (fan-drive hydraulic motor 7 load pressure $P_{mLS}$) at the flow volume control valve 69, on the other hand, is applied to the pilot port 77c provided on the same side as the spring 77a in opposition to the pilot port 77b, via pipelines 47b and 81.

Accordingly, when the pressure differential Pm $P_{mLS}$ is greater than the second set pressure differential $\Delta P_{mLS}$, the LS valve 77 is moved to the valve position on the left side in the drawing. Thus the pressure oil discharged by the pump is made to flow into the servo piston 51 via pipelines 47a, 78, and 80, the LS valve 77, and pipeline 82, and the swash plate 7c in the fan-drive hydraulic motor 7 is moved to the minimum capacity side MIN. For this reason, the flow volume Qm made to flow into the fan-drive hydraulic motor 7 is reduced, and the discharge pressure Pm of the main hydraulic pump 2 becomes smaller. As a result, the pressure differential Pm $P_{mLS}$ becomes smaller and is made to coincide with the set pressure differential $\Delta P_{mLS}$.

Conversely, when the pressure differential Pm $P_{mLS}$ becomes smaller than the second set pressure differential $\Delta P_{mLS}$, the LS valve is moved to the valve position on the right. Thus pressure oil is made to flow out to the tank 9 via the pipeline 82, LS valve 77, pipeline 83, and pipeline 76, and the swash plate 7 in the fan-drive hydraulic motor 7 is moved to the maximum capacity side MAX. Hence the flow volume Qm made to flow into the fan-drive hydraulic motor 7 increases and the discharge pressure Pm of the main hydraulic pump 2 rises. As a result, the pressure differential Pm $P_{mLS}$ becomes larger and is made to coincide with the second set pressure differential $\Delta P_{mLS}$. Thus the pressure differential Pm $P_{mLS}$ before and after the flow volume control valve 69 is continually maintained at the second set pressure differential $\Delta P_{mLS}$ by the LS valve 77, in the manner described in the foregoing.

Figure 8:
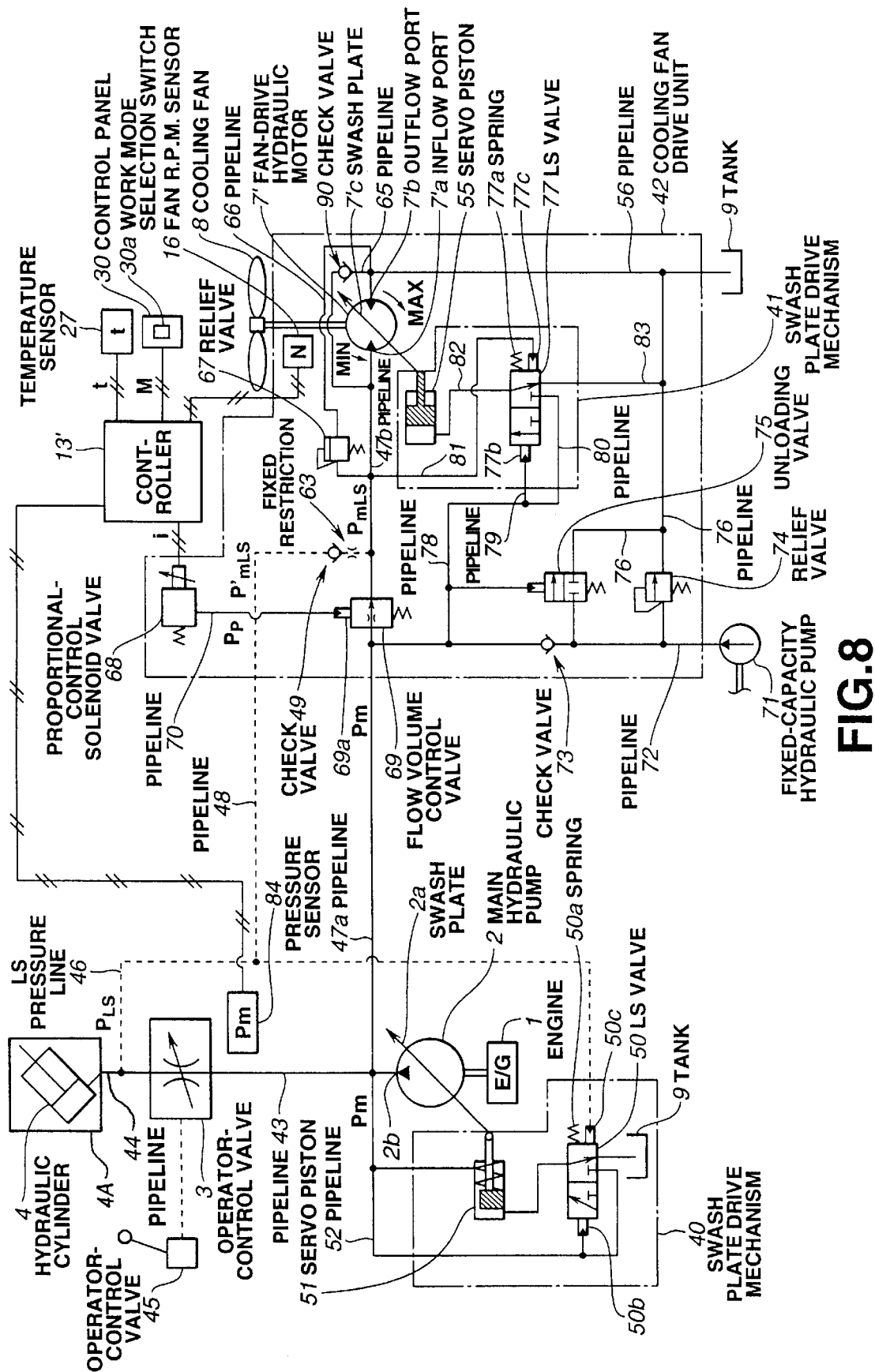
FIG. 8 is a hydraulic circuit diagram representing yet another embodying aspect of a cooling fan drive apparatus relating to the present invention.

Next, the operation of the hydraulic circuit diagrammed in FIG. 8 is described, focusing on the processing performed by the controller 13.

Load-sensing control is effected with the LS valve 77 to make the pressure differential $\Delta Pm$ between the pressure Pm before and the pressure $P_{mLS}$ after the flow volume control valve 69 ($\Delta Pm=Pm\ P_{mLS}$) the second set pressure differential $\Delta P_{mLS}$.

Here, from the general formulas for hydraulic circuits, if Ar is the aperture area of the restriction in the flow volume control valve 69 and c is the flow volume coefficient, then the relationship expressed below is established between the flow volume Qm flowing before and after the restriction in the flow volume control valve 69 (that is, the flow volume Qm supplied to the fan-drive hydraulic motor 7) and the pressure differential ΔPm before and after the restriction in the flow volume control valve 69.

$$Qm = c \cdot Ar \cdot \sqrt{(\Delta Pm)} \qquad (1)$$

Now, by performing load-sensing control with the LS valve 77, the before-and-after pressure differential ΔP is maintained at the second set pressure differential $\Delta P_{mLS}$. Accordingly, as is evident from formula (1) above, a flow volume Qm is obtained which is directly proportional to the aperture area Ar. The R.P.M. N of the cooling fan 8 varies in response to the flow volume Qm. That being so, it is then only necessary to generate in the controller 13 an aperture area Ar command that corresponds to the target fan R.P.M. Na.

In the controller 13, as in the embodying aspect diagrammed in FIG. 7, a target fan R.P.M. Na is found which corresponds to the detected temperature t. In this case, it is permissible also to vary the target fan R.P.M. Na according to the work mode M selected with the work mode selection switch 30a. It is also permissible to vary the target fan R.P.M. Na according to the pump discharge pressure Pm detected by the pressure sensor 84. Thereupon, the controller 13 computes the aperture area Ar for the flow volume control valve 69 needed to obtain the target fan R.P.M. Na so found, and generates the current command i necessary for obtaining that aperture area Ar. This current command i is output to the proportional-control solenoid valve 68 in the cooling fan drive unit 42.

Accordingly, the drive command value Pp (aperture command Ar) is applied to the flow volume control valve 69 from the proportional-control solenoid valve 68, and the flow volume control valve 69 is driven, whereby the flow volume Qm supplied to the fan-drive hydraulic motor 7 is varied in direct proportion with the aperture command Ar. The cooling fan 8 R.P.M. N varies, in turn, in direct proportion with this supplied flow volume Qm, and the torque T absorbed by the fan-drive hydraulic motor 7 is varied according to the variation in the cooling fan 8 R.P.M. N.

Thus the constant absorbed torque value Ta required by the fan-drive hydraulic motor 7 is obtained by controlling the flow volume control valve 69 in this manner, and a constant fan R.P.M. Na is obtained for the cooling fan 8.

Furthermore, because provision is made for effecting load-sensing control with the LS valve 77, a constant fan R.P.M. Na is obtained at the cooling fan 8 that is directly proportional to the aperture area Ar in the flow volume control valve 69, even when the load $P_{mLS}$ on the fan-drive hydraulic motor 7 is fluctuating. Thus, as based on this embodying aspect, a benefit is realized in that, even in cases where the load on the fan-drive hydraulic motor 7 fluctuates, fluctuation in the R.P.M. N of the cooling fan 8 is suppressed and the turning thereof stabilizes.

Meanwhile, in the LS valve 50 on the main hydraulic pump 2 side also, load-sensing control is being performed to make the pressure differential ΔP between the discharge pressure Pm of the main hydraulic pump 2 and the load pressure $P_{LS}$ on the hydraulic cylinder 4 the first set pressure differential $\Delta P_{LS}$. The main hydraulic pump 2 here is a hydraulic drive source common to both the hydraulic cylinder 4 and the fan-drive hydraulic motor 7. That being so, if load-sensing control is performed under conditions wherein either the hydraulic cylinder 4 load (working equipment load) is light or the cooling fan 8 is being activated alone, the load pressure $P_{LS}$ on the hydraulic cylinder 4 becomes low, and in conjunction therewith the discharge pressure Pm of the main hydraulic pump 2 becomes low also. Accordingly, the flow volume supplied to the fan-drive hydraulic motor 7 from the main hydraulic pump 2 is insufficient. Thus the minimum torque required for turning the fan-drive hydraulic motor 7 can no longer be secured.

Thereupon, in this embodying aspect, as in the embodying aspect diagrammed in FIG. 7, provision is made to secure the minimum torque necessary for turning the fan-drive hydraulic motor 7.

Specifically, the pressure on the outflow side of the check valve 49 is the load pressure $P_{LS}$ on the hydraulic cylinder 4, and the pressure on the inflow side of the check valve 49 is the load pressure $P_{mLS}$ at the fan-drive hydraulic motor 7.

When conditions are such that the hydraulic cylinder 4 load (working equipment load) is light, the fan-side pressure $P_{mLS}$ is higher than the working equipment side load pressure $P_{LS}$, wherefore pressure oil under a pressure of $P_{mLS}$ is made to flow out from the check valve 49 to the pipeline 48, and thus acts on the pilot port 50c via the pipeline 48 and the LS pressure line 46.

Therefore, load-sensing control is performed with the LS valve 50 to make the pressure differential between the discharge pressure Pm of the main hydraulic pump 2 and the fan-side load pressure $P_{mLS}$ the first set pressure differential $\Delta P_{LS}$. The fan-side load pressure $P_{mLS}$ is higher than the load pressure $P_{LS}$ on the hydraulic cylinder 4, wherefore, in conjunction therewith, the discharge pressure Pm of the main hydraulic pump 2 rises. Accordingly, the load pressure $P_{mLS}$ relative to the fan-drive hydraulic motor 7 increases. Thus the minimum torque required for turning the fan-drive hydraulic motor 7 is secured.

Under conditions wherein the hydraulic cylinder 4 load (working equipment load) is great, the working equipment-side load pressure $P_{LS}$ is higher than the fan-side load pressure $P_{mLS}$ so the pressure oil exhibiting a pressure $P_{mLS}$ is not made to flow out from the check valve 49 to the pipeline 48. Hence load-sensing control is performed with the LS valve 50 to make the pressure differential ΔP between the main hydraulic pump 2 discharge pressure Pm and the hydraulic cylinder 4 load pressure $P_{LS}$ the first set pressure differential $\Delta P_{LS}$.

The main hydraulic pump 2 is the common hydraulic drive source for both the working equipment hydraulic cylinder 4 and the fan-drive hydraulic motor 7. That being so, when the working equipment hydraulic cylinder 4 is driven and the working equipment is activated, most of the flow volume of the pressure oil discharged from the main hydraulic pump 2 is supplied to the working equipment hydraulic cylinder 4. Hence the flow volume supplied to the fan-drive hydraulic motor 7 from the main hydraulic pump 2 is inadequate. At this time, the pressure oil discharged from the fixed-capacity hydraulic pump 71 is made to flow into the flow volume control valve 69, and supplied via the flow volume control valve 69 to the fan-drive hydraulic motor 7.

Thus, as based on this embodying aspect, pressure oil is supplied to the fan-drive hydraulic motor 7 from a fixed-capacity hydraulic pump 71 provided in addition to the main hydraulic pump 2, wherefore the inadequacy in flow volume is made up for. The auxiliary hydraulic pump 71 may also be configured as a variable-capacity type.

Furthermore, when the flow volume discharged from the main hydraulic pump 2 becomes large and the pump discharge pressure becomes high, the unloading valve 75 is switched to the open position, and the pressure oil discharged from the fixed-capacity hydraulic pump 71 is discharged to the tank 9 via the unloading valve 75 and the pipeline 76.

When the discharge pressure of the fixed-capacity hydraulic pump 71 becomes high, the relief valve 74 is activated to the open position side, and the pressure oil discharged from the fixed-capacity hydraulic pump 71 is discharged to the tank 9 via the relief valve 74 and the pipeline 76.

When the pressure $P_{mLS}$ on the outflow port side of the flow volume control valve 69 becomes high, the relief valve 67 is activated to the open position side and the pressure oil made to from the flow volume control valve 69 is discharged to the tank 9 via the relief valve 67 and the pipelines 66 and 56.

Also, pressure oil from the tank 9 is routed through the check valve 90 in the pipeline 65, together with pressure oil discharged from the main hydraulic pump 2, to the inflow port 7a of the fan-drive hydraulic motor 7. Accordingly, the development of cavitation can be prevented in cases such as when a very rapid pressure fluctuation occurs.

As based on the embodying aspect diagrammed in FIG. 8, as described in the foregoing, the cooling fan 8 R.P.M. (air volume) is controlled by drive-controlling the swash plate drive mechanism 41 to vary the capacity (swash plate 7c) of the variable-capacity fan-drive hydraulic motor 7. For the swash plate drive mechanism 41, a mechanism like the swash plate drive mechanism 40 used to drive the swash plate in main hydraulic pumps 2 employed in ordinary working equipment can be used in constructing a hydraulic circuit. Accordingly, it is possible to provide a cooling fan drive apparatus of high general usefulness.

As based on this embodying aspect, moreover, an existing main hydraulic pump 2 for driving working equipment can be used as the hydraulic pump for driving a fan, wherefore no deployment of a dedicated fan-drive hydraulic pump is necessary. Thus the number of parts in the hydraulic machinery can be reduced.

As based on this embodying aspect, moreover, the flow volume control valve 69 for controlling the flow volume of the pressure oil supplied to the fan-drive hydraulic motor 7 is deployed also on the fan-drive hydraulic motor 7 side, in like manner as the control valve 3 for controlling the flow volume of the pressure oil supplied to the hydraulic cylinder 4-for the working equipment. Load-sensing control is also performed with the LS valve 77 to make the pressure differential $\Delta P$ between the pressures Pm and $P_{mLS}$ before and after the flow volume control valve 69 ($\Delta Pm = Pm\ P_{mLS}$) the second set pressure differential. Thus a benefit is gained in that, even when the load on the fan-drive hydraulic motor 7 fluctuates, fluctuations in the R.P.M. N of the cooling fan 8 are suppressed and the turning thereof stabilizes.

As based on this embodying aspect, furthermore, a benefit is gained in that, even under conditions wherein the flow volume supplied to the fan-drive hydraulic motor 7 from the main hydraulic pump 2 is insufficient, the minimum torque required for turning the fan-drive hydraulic motor 7 is secured.

Another embodying aspect is now described with reference to FIG. 9. The same configuring elements are designated by the same signals in this figure as in FIG. 8, thus avoiding redundant description. The cooling fan drive unit 42 in FIG. 9 is also assumed to have more or less the same configuration as in FIG. 8, thus avoiding redundant representation in the drawings, as appropriate.

This embodying aspect is an embodying aspect that is applied to cases where two main hydraulic pumps, 2 and 2, are provided. In this embodying aspect, tandem pumps 2 and 2 are assumed wherein swash plates 2a and 2a are driven independently. However, the present invention can be applied if the hydraulic pump is provided with a plurality of pressure oil discharge ports, and the structure of the hydraulic pump is altogether discretionary. Instead of tandem pumps, for example, a double-flow-way type of hydraulic pump may be used wherein the swash plate is common to two pressure oil discharge ports. The number of pressure oil discharge ports provided need not be limited to two either, but may be three or more. A plurality of hydraulic actuators (hydraulic cylinders) may also be deployed corresponding to the number of pressure oil discharge ports.

Figure 9:
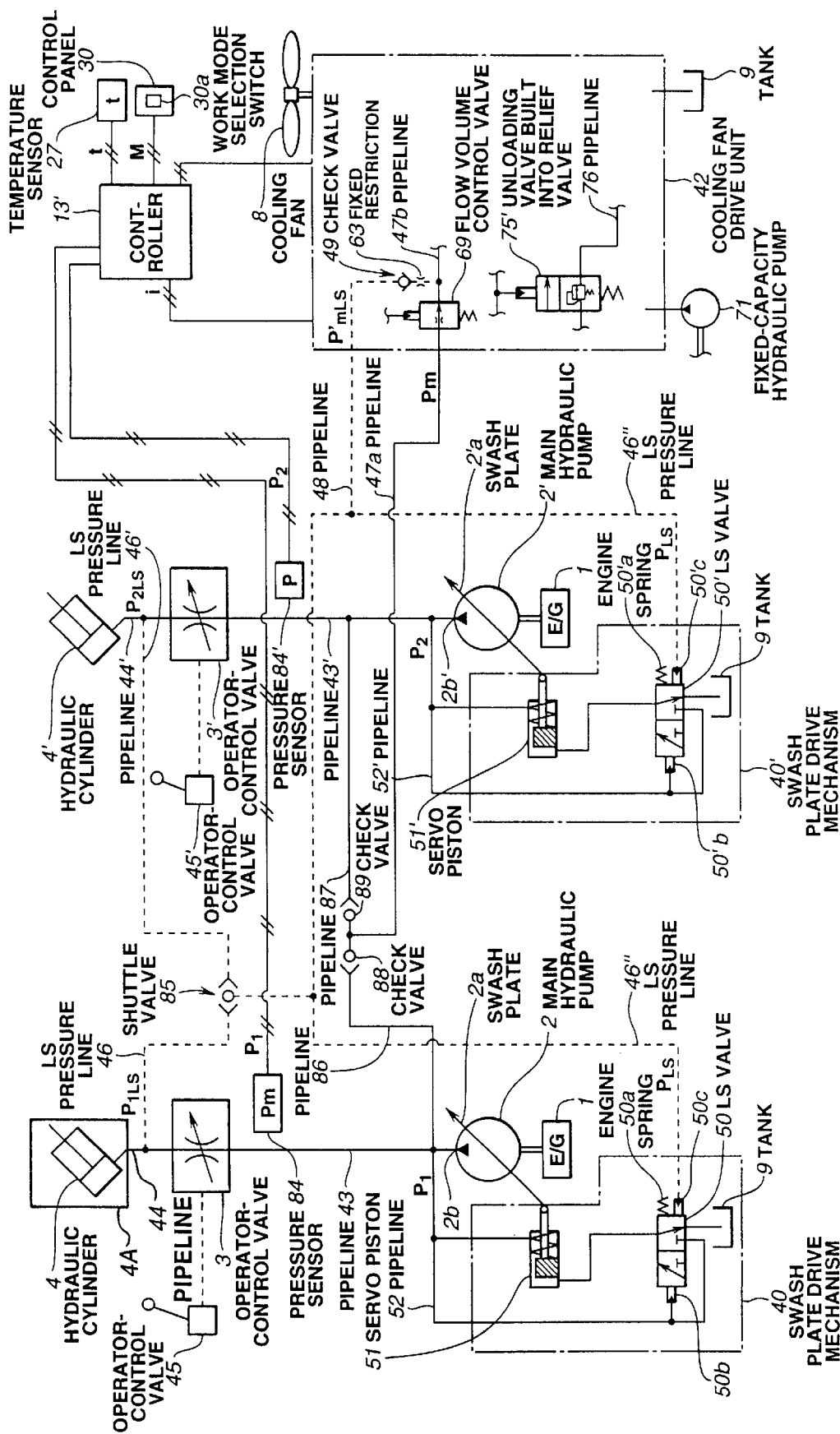
FIG. 9 is a hydraulic circuit diagram representing yet another embodying aspect of a cooling fan drive apparatus relating to the present invention.

In FIG. 9, it is assumed that the configuring elements pertaining to the one hydraulic pump 2 and the configuring elements pertaining to the other hydraulic pump 2 are identical, whereupon the symbols for the configuring elements pertaining to the one hydraulic pump 2 are used for the configuring elements pertaining to the other hydraulic pump 2 but with a prime mark () added in the latter case, thereby avoiding redundant description.

The pressure of the discharge pressure oil discharged from the pressure oil discharge port 2b of the one hydraulic pump 2 is represented as P1, and the pressure of the discharge pressure oil discharged from the pressure oil discharge port 2b of the other hydraulic pump 2 as P2.

To the pump pressure discharge pipeline 43 of the one hydraulic pump 2 is connected a branched pipeline 86. To the pump pressure discharge pipeline 43 of the other hydraulic pump 2 is connected a branched pipeline 87. A check valve 88 is deployed in the pipeline 86, and a check valve 89 is deployed in the pipeline 87. These check valves 88 and 89 are deployed so that the outflow ports thereof are in opposition. The outflow ports of the check valves 88 and 89 are connected to a pipeline 47a. This pipeline 47a, as diagrammed in FIG. 8, is connected to the cooling fan drive unit 42. That is, the pipeline 47a is connected to the flow volume control valve 69.

Accordingly, with the check valves 88 and 89, that pressure oil having the higher pressure Pm is selected from among the pump discharge pressure oils, having the pressures P1 and P2, discharged from the pressure oil discharge ports 2b and 2b in the two hydraulic pumps 2 and 2, respectively, and output to the pipeline 47a. In other words, the pump discharge pressure oil having the highest pressure Pm will flow into the flow volume control valve 69.

A shuttle valve may be used instead of the opposing check valves 88 and 89 noted above.

The load pressure on the one hydraulic cylinder 4 is designated as $P_{1LS}$ and the load pressure on the other hydraulic cylinder 4 as $P_{2LS}$.

To the pipeline 44 communicating with the one hydraulic cylinder 4 is connected an LS pressure line 46, while to a pipeline 44 communicating with the other hydraulic cylinder 4 is connected an IS pressure line 46. The LS pressure lines 46 and 46 are connected to the inflow port of a shuttle valve 85. The outflow port of the shuttle valve 85 is connected to an LS pressure line 46. The LS pressure line 46 is connected to the pilot ports 50c and 50c in the LS valves 50 of the swash plate drive mechanisms 40 and 40. The outflow port of the shuttle valve 85 is connected to the pipeline 48 via the LS pressure line 46. The pipeline 48 is connected to the cooling fan drive unit 42, as in FIG. 8. That is, the pipeline 48 communicates with the outflow port in the check valve 49.

Accordingly, the larger load pressure $P_{LS}$ of the load pressures $P_{1LS}$ and $P_{2LS}$ on the two hydraulic cylinders 4 and 4, respectively, is selected by the shuttle valve 85 and output to the LS pressure line 46. For this reason, load-sensing control is performed with the LS valve 50 on the one main hydraulic pump 2 side to make the pressure differential ΔP between the discharge pressure P1 of the main hydraulic pump 2 and the larger of the load pressures $P_{LS}$ on the two hydraulic cylinders 4 and 4 the first set pressure differential. Similarly, load-sensing control is performed with the LS valve 50 on the other main hydraulic pump 2 side to make the pressure differential ΔP between the discharge pressure P2 of the main hydraulic pump 2 and the larger of the load pressures $P_{LS}$ on the two hydraulic cylinders 4 and 4 the first set pressure differential.

Meanwhile, the larger load pressure $P_{LS}$ on the two hydraulic cylinders 4 and 4 is acting on the outflow port of the check valve 49, wherefore the larger of this maximum load pressure $P_{LS}$ and the pressure $P_{mLS}$ on the inflow side of the check valve 49 is selected and made to flow out from the check valve 49 to the pipeline 48.

Opposing check valves may be used in place of the shuttle valve 85.

The operations performed by the embodying aspect diagrammed in FIG. 9 are now described.

With this embodying aspect, as with the embodying aspect diagrammed in FIG. 8, the minimum torque required for turning the fan-drive hydraulic motor 7 is secured.

Specifically, the pressure on the outflow side of the check valve 49 here is the higher load pressure $P_{LS}$ of the load pressures on the two hydraulic cylinders 4 and 4, while the pressure on the inflow side of the check valve 49 is the load pressure $P_{mLS}$ at the fan-drive hydraulic motor 7.

Under conditions where the load on the hydraulic cylinders 4 and 4 (working equipment load) is light, the fan-side pressure $P_{mLS}$ is higher than the maximum load pressure $P_{LS}$ on the working equipment side, wherefore pressure oil under a pressure of $P_{mLS}$ flows out from the check valve 49 to the pipeline 48, and is applied via the LS pressure line 46 to the pilot ports 50c and 50c in the LS valves 50 and 50, respectively.

For this reason, load-sensing control is performed with the LS valve 50 to make the pressure differential between the main hydraulic pump 2 discharge pressure P1 and the fan-side load pressure $P_{mLS}$ the first set pressure differential $ΔP_{LS}$. Similarly, load-sensing control is performed with the LS valve 50 to make the pressure differential between the main hydraulic pump 2 discharge pressure P2 and the fan-side load pressure $P_{mLS}$ the first set pressure differential $ΔP_{LS}$. The fan-side load pressure $P_{mLS}$ is higher than the maximum load pressure $P_{LS}$ on the two hydraulic cylinders 4 and 4, wherefore, in conjunction therewith, the discharge pressures P1 and P2 on the main hydraulic pumps 2 and 2, respectively, also become high. Accordingly, the maximum discharge pressure Pm of the two main hydraulic pumps 2 and 2 is made high and made to flow into the flow volume control valve 69. As a consequence thereof, the pressure on the pressure oil made to flow out from the flow volume control valve 69, that is, the load pressure $P_{mLS}$ at the fan-drive hydraulic motor 7, increases. Thus the minimum torque necessary for turning the fan-drive hydraulic motor 7 is secured.

Under conditions where the load on the hydraulic cylinders 4 and 4 (working equipment load) is high, the maximum load pressure $P_{LS}$ on the working equipment side is higher than the fan-side load pressure $P_{mLS}$ wherefore the pressure oil under a pressure of $P_{mLS}$ is made to flow out from the check valve 49 to the pipeline 48. For this reason, load-sensing control is performed with the LS valve 50 to make the pressure differential ΔP between the main hydraulic pump 2 discharge pressure P1 and the maximum load pressure PLS on the two hydraulic cylinders 4 and 4 the first set pressure differential $ΔP_{LS}$. Similarly, load-sensing control is performed with the LS valve 50 to make the pressure differential ΔP between the main hydraulic pump 2 discharge pressure P2 and the maximum load pressure $P_{LS}$ on the two hydraulic cylinders 4 and 4 the first set pressure differential $ΔP_{LS}$.

Furthermore, with the hydraulic circuit diagrammed in FIG. 8, the unloading valve 75 and the relief valve 74 are deployed as separate units in the cooling fan drive unit 42, but embodiment is also possible using an unloading valve 75 having a built-in relief valve 74 instead of the unloading valve 75, as diagrammed in FIG. 9.

Thus, as based on the embodying aspect diagrammed in FIG. 9, when a plurality of pressure oil discharge ports 2b and 2b are provided in main hydraulic pumps 2 and 2, respectively, the pressure oil discharged by the pump on the high-pressure side can be supplied to the fan-drive hydraulic motor 7.

As based on this embodying aspect, moreover, a benefit is gained in that the minimum torque required for turning the fan-drive hydraulic motor 7 can be secured even under conditions wherein the flow volume supplied to the fan-drive hydraulic motor 7 from the plurality of pressure oil discharge ports 2b and 2b in the main hydraulic pumps 2 and 2, respectively, is insufficient.

The cooling fan drive apparatuses in the embodying aspects described in the foregoing can be employed in all kinds of hydraulic-drive machinery, including construction machinery.

What is claimed is:

1. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil, comprising:

a variable-capacity dedicated fan drive hydraulic pump driven by said drive source;

a hydraulic motor for turning said cooling fan, actuated by inflow through an inflow port of pressure oil discharged from said variable-capacity dedicated fan drive hydraulic pump;

temperature detection means for detecting temperature of said drive source or of said actuation pressure oil;

setting means for setting correlation between said temperature of said drive source or said actuation pressure oil and a target fan rotational speed for said cooling fan; and capacity control means for controlling target fan rotational speed corresponding to temperature detected by said temperature detection means, in accordance with correlation set by said setting means, and varying the capacity of said variable-capacity dedicated fan drive hydraulic pump so that said cooling fan rotational speed becomes said target fan rotational speed.

2. The cooling fan drive apparatus according to claim 1, further comprising pump input rotational speed detection means for detecting input rotational speed of said variable-capacity dedicated fan drive hydraulic pump, wherein said capacity control means vary capacity of said variable-capacity dedicated fan drive hydraulic pump so that flow volume of pressure oil discharged by said variable-capacity dedicated fan drive hydraulic pump, as based on rotational speed detected by said pump input rotational speed detection means, becomes a target discharge flow volume corresponding to temperature detected by said temperature detection means.

3. The cooling fan drive apparatus according to claim 1 or 2, further comprising fan rotational speed detection means for detecting cooling fan rotational speed, wherein said capacity control means effects control so that, as based on detection results of said fan rotational speed detection means, said target fan rotational speed or said target discharge flow volume is obtained.

4. The cooling fan drive apparatus according to claim 1 or 2, further comprising working machine actuated by said hydraulic actuator and work mode selection means for selecting work mode performed by said working machine, wherein said target fan rotational speed or said target discharge flow volume is determined according to work mode selected by said work mode selection means.

5. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:
    a fixed-capacity hydraulic pump driven by said drive source;
    a variable-capacity hydraulic motor for turning said cooling fan, actuated by inflow through an inflow port of pressure oil discharged from said fixed-capacity hydraulic pump;
    a fixed restriction provided in pressure oil discharge pipeline of said fixed-capacity hydraulic pump; and
    capacity control means for detecting input rotational speed of said fixed-capacity hydraulic pump according to difference in pressure before and after said fixed restriction, and varying capacity of said variable-capacity hydraulic motor so that a rotational speed of said cooling fan becomes a target rotational speed, based on input rotational speed so detected.

6. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:
    a variable-capacity hydraulic motor for turning said cooling fan, activated by inflow, through an inflow port, of pressure oil discharged from said main hydraulic pump; and
    means for causing communication, by a pipeline, between a tank into which pressure oil flowing out from said variable-capacity hydraulic motor is discharged and inflow port of said variable-capacity hydraulic motor, and for routing pressure oil, through that pipeline, only to said inflow port of said variable-capacity.

7. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:
    a variable-capacity hydraulic motor for turning said cooling fan, activated by inflow, through an inflow port, of pressure oil discharged from said main hydraulic pump;
    temperature detection means for detecting temperature of said drive source or said actuation pressure oil;
    setting means for setting correlation between temperature of said drive source or of said actuation pressure oil and a target fan rotational speed for said cooling fan; and
    capacity control means for determining a target fan rotational speed corresponding to temperature detected by said temperature detection means, in accordance with correlation set by said setting means, and varying capacity of said variable-capacity hydraulic motor so that said cooling fan rotational speed becomes that determined target fan rotational speed.

8. The cooling fan drive apparatus according to claim 7, further comprising fan rotational speed detection means for detecting rotational speed of said cooling fan, wherein said capacity control means effects control so that a target fan rotational speed is obtained based on detection results of said fan rotational speed detection means.

9. The cooling fan drive apparatus according to claim 7, further comprising pump input rotational speed detection means for detecting input rotational speed of said main hydraulic pump, wherein said target fan rotational speed is determined in response to input rotational speed detected by said pump input rotational speed detection means.

10. The cooling fan drive apparatus according to claim 7, further comprising working machine activated by said hydraulic actuator, and work mode selection means for selecting work mode performed by said working machine; wherein said target fan rotational speed is determined according to work mode selected by said work mode selection means.

11. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:
    a variable-capacity hydraulic motor for turning said cooling fan, activated by inflow, through an inflow port, of pressure oil discharged from said main hydraulic pump; and
    torque control means for effecting control so that torque absorbed by said variable-capacity hydraulic motor coincides with a target absorbed torque.

12. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil; comprising:
    a variable-capacity hydraulic motor for turning said cooling fan, activated by inflow, through an inflow port, of pressure oil discharged from said main hydraulic pump; and
    a capacity control valve for controlling capacity of said variable-capacity hydraulic motor so that torque absorbed by said variable-capacity hydraulic motor coincides with a set absorbed torque.

13. A cooling fan drive apparatus having a main hydraulic pump driven by a drive source; a hydraulic actuator actuated by supply of actuation pressure oil discharged from said main hydraulic pump, via a control valve; a cooling fan for cooling said drive source or said actuation pressure oil; and a main pump capacity control valve for controlling capacity of said main hydraulic pump so that pressure differential between discharge pressure of said main hydraulic pump and load pressure at said hydraulic actuator becomes a desired set pressure differential; comprising:

a variable-capacity hydraulic motor for turning said cooling fan, activated by inflow, through an inflow port, of pressure oil discharged from said main hydraulic pump;

a capacity control valve for controlling capacity of said variable-capacity hydraulic motor so that torque absorbed by said variable-capacity hydraulic motor coincides with a set absorbed torque; and load pressure selection means for selecting from among load pressure at said hydraulic actuator and load pressure at said variable-capacity hydraulic motor whichever load pressure is greater; wherein:

said main hydraulic pump capacity control means are made to exercise control so as to render pressure differential between discharge pressure of said main hydraulic pump and load pressure selected by said load pressure selection means a desired set pressure differential.

14. A cooling fan drive apparatus having a main hydraulic pump driven by a drive source; a hydraulic actuator actuated by supply of actuation pressure oil discharged from said main hydraulic pump, via a control valve; a cooling fan for cooling said drive source or said actuation pressure oil; and main hydraulic control valve for controlling capacity of the hydraulic pump so that a differential pressure between a discharge pressure of the main hydraulic pump and a load pressure of the hydraulic actuator becomes a first set differential pressure comprising:

a variable-capacity hydraulic motor for turning said cooling fan;

a flow volume control valve, provided in a pipeline connecting pressure oil discharge port of said main hydraulic pump and inflow port of said variable-capacity hydraulic motor, for controlling flow volume of pressure oil made to flow from said pressure oil discharge port of said main hydraulic pump into said inflow port of said variable-capacity hydraulic motor; and differential pressure control valve for controlling capacity of the variable-capacity hydraulic motor so that a differential pressure between pressure of pressure oil flowing into the flow volume control valve and pressure of pressure oil flowing out from the flow volume control valve becomes a second set differential pressure.

15. A cooling fan drive apparatus having a main hydraulic pump driven by a drive source; a hydraulic actuator actuated by supply of actuation pressure oil discharged from said main hydraulic pump, via a control valve; a cooling fan for cooling said drive source or said actuation pressure oil; and a main pump capacity control valve for controlling capacity of said main hydraulic pump so that pressure differential between discharge pressure of said main hydraulic pump and load pressure at said hydraulic actuator becomes a first set pressure differential; comprising:

a variable-capacity hydraulic motor for turning said cooling fan;

a flow volume control valve, provided in a pipeline connecting pressure oil discharge port of said main hydraulic pump and inflow port of said variable-capacity hydraulic motor, for controlling flow volume of pressure oil made to flow from said pressure oil discharge port of said main hydraulic pump into said inflow port of said variable-capacity hydraulic motor;

a pressure differential control valve for controlling capacity of said variable-capacity hydraulic motor so that pressure differential between pressure of pressure oil flowing into said flow volume control valve and pressure of pressure oil flowing out from said flow volume control valve becomes a second set pressure differential; and pressure selection means for selecting from among load pressure at said hydraulic actuator and pressure of pressure oil flowing out from said flow volume control valve whichever pressure is greater; wherein:

said main hydraulic pump capacity control means are made to exercise control so as to make pressure differential between discharge pressure of said main hydraulic pump and pressure selected by said pressure selection means a first set pressure differential.

16. The cooling fan drive apparatus according to claim 12, 13, 14, or 15, further comprising means for causing communication, by a pipeline, between a tank into which pressure oil flowing out from said variable-capacity hydraulic motor is discharged and said inflow port of said variable-capacity hydraulic motor, and for routing pressure oil, through that pipeline, only to said inflow port of said variable-capacity hydraulic motor.

17. A cooling fan drive apparatus having a main hydraulic pump driven by a drive source and provided with a plurality of pressure oil discharge ports; a hydraulic actuator actuated by supply of actuation pressure oil discharged from said plurality of pressure oil discharge ports of said main hydraulic pump, via a control valve; and a cooling fan for cooling said drive source or said actuation pressure oil; comprising:

selection means for selecting, from among actuation pressure oils discharged from said plurality of pressure oil discharge ports in said main hydraulic pump, that actuation pressure oil having greatest pressure; and a variable-capacity hydraulic motor for turning said cooling fan, activated by flowing in of actuation pressure oil selected by said selection means from said inflow port.

18. A cooling fan drive apparatus having a main hydraulic pump driven by a drive source and provided with a plurality of pressure oil discharge ports; a plurality of hydraulic actuators actuated by supply of actuation pressure oil discharged from said plurality of pressure oil discharge ports of said main hydraulic pump, via control valves; and a cooling fan for cooling said drive source or said actuation pressure oil; comprising:

a variable-capacity hydraulic motor for turning said cooling fan;

pump pressure selection means for selecting, from among actuation pressure oils discharged from said plurality of pressure oil discharge ports in said main hydraulic pump, that actuation pressure oil having greatest pressure;

a pipeline for connecting actuation pressure oil selected by said pump pressure selection means to inflow port in said variable-capacity hydraulic motor;

a flow volume control valve, provided in said pipeline, for controlling flow volume of pressure oil flowing into said inflow port in said variable-capacity hydraulic motor;

a pressure differential control valve for controlling capacity of said variable-capacity hydraulic motor so that pressure differential between pressure of pressure oil flowing into said flow volume control valve and pressure of pressure oil flowing out from said flow volume control valve becomes a second set pressure differential; and load pressure selection means for selecting from among load pressures at said plurality of hydraulic actuators and pressure of pressure oil flowing out from said flow volume control valve whichever pressure is greatest; wherein:

said main hydraulic pump capacity control means are made to exercise control so as to render pressure differential between discharge pressure of said main hydraulic pump and pressure selected by said load pressure selection means said first set pressure differential.

19. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil, comprising:

a variable-capacity hydraulic pump driven by said drive source;

a hydraulic motor for turning said cooling fan, actuated by inflow through an inflow port of pressure oil discharged from said variable-capacity hydraulic pump;

temperature detection means for detecting temperature of said drive source or of said actuation pressure oil;

setting means for setting correlation between said temperature of said drive source or said actuation pressure oil and a target fan rotational speed for said cooling fan;

capacity control means for determining target fan rotational speed corresponding to temperature detected by said temperature detection means, in accordance with correlation set by said setting means, and varying capacity of said variable-capacity hydraulic pump so that said cooling fan rotational speed becomes that determined target fan rotational speed; and fan rotational speed detection means for detecting cooling fan rotational speed, wherein said capacity control means effects control so that, as based on detection results of said fan rotational speed detection means, said target fan rotational speed or said target discharge flow volume is obtained.

20. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil, comprising:

a variable-capacity hydraulic pump driven by said drive source;

a hydraulic motor for turning said cooling fan, actuated by inflow through an inflow port of pressure oil discharged from said variable-capacity hydraulic pump;

temperature detection means for detecting temperature of said drive source or of said actuation pressure oil;

setting means for setting correlation between said temperature of said drive source or said actuation pressure oil and a target fan rotational speed for said cooling fan;

capacity control means for determining target fan rotational speed corresponding to temperature detected by said temperature detection means, in accordance with correlation set by said setting means, and varying capacity of said variable-capacity hydraulic pump so that said cooling fan rotational speed becomes that determined target fan rotational speed;

pump input rotational speed detection means for detecting input rotational speed of said variable-capacity hydraulic pump, wherein said capacity control means vary capacity of said variable-capacity hydraulic pump so that flow volume of pressure oil discharged by said variable capacity hydraulic pump, as based on rotational speed detected by said pump input rotational speed detection means, becomes a target discharge flow volume corresponding to temperature detected by said temperature detection means; and fan rotational speed detection means for detecting cooling fan rotational speed, wherein said capacity control means effects control so that, as based on detection results of said fan rotational speed detection means, said target fan rotational speed or said target discharge flow volume is obtained.

21. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil, comprising:

a variable-capacity hydraulic pump driven by said drive source;

a hydraulic motor for turning said cooling fan, actuated by inflow through an inflow port of pressure oil discharged from said variable-capacity hydraulic pump;

temperature detection means for detecting temperature of said drive source or of said actuation pressure oil;

setting means for setting correlation between said temperature of said drive source or said actuation pressure oil and a target fan rotational speed for said cooling fan;

capacity control means for determining target fan rotational speed corresponding to temperature detected by said temperature detection means, in accordance with correlation set by said setting means, and varying capacity of said variable-capacity hydraulic pump so that said cooling fan rotational speed becomes that determined target fan rotational speed;

a working machine actuated by said hydraulic actuator; and a work mode selection means for selecting work mode performed by said working machine, wherein said target fan rotational speed or said target discharge flow volume is determined according to work mode selected by said work mode selection means.

22. A cooling fan drive apparatus having a main hydraulic pump driven by a drive source; a hydraulic actuator actuated by supply of actuation pressure oil discharged from said main hydraulic pump, via a control valve; and a cooling fan for cooling said drive source or said actuation pressure oil, comprising:

a variable-capacity hydraulic pump driven by said drive source;

a hydraulic motor for turning said cooling fan, actuated by inflow through an inflow port of pressure oil discharged from said variable-capacity hydraulic pump;

temperature detection means for detecting temperature of said drive source or of said actuation pressure oil;

setting means for setting correlation between said temperature of said drive source or said actuation pressure oil and a target fan rotational speed for said cooling fan;

capacity control means for determining target fan rotational speed corresponding to temperature detected by said temperature detection means, in accordance with correlation set by said setting means, and varying capacity of said variable-capacity hydraulic pump so that said cooling fan rotational speed becomes that determined target fan rotational speed;

pump input rotational speed detection means for detecting input rotational speed of said variable-capacity hydraulic pump, wherein said capacity control means vary capacity of said variable-capacity hydraulic pump so that flow volume of pressure oil discharged by said variable-capacity hydraulic pump, as based on rotational speed detected by said pump input rotational speed detection means, becomes a target discharge flow volume corresponding to temperature detected by said temperature detection means;

a working machine actuated by said hydraulic actuator; and a work mode selection means for selecting work mode performed by said working machine, wherein said target fan rotational speed or said target discharge flow volume is determined according to work mode selected by said work mode selection means.

\* \* \* \* \*